(12) United States Patent
Wehmeier et al.

(10) Patent No.: US 8,658,816 B2
(45) Date of Patent: Feb. 25, 2014

(54) PRECIPITATED SILICAS AS A REINFORCING FILLER FOR ELASTOMER MIXTURES

(75) Inventors: Andre Wehmeier, Rheine (DE); Oleg Stenzel, Frankfurt am Main (DE); Weicheng Wu, Recklinghausen (DE); Christian Goetz, Seligenstadt (DE); Werner Niedermeier, Bruehl (DE); Marinus Haddeman, Bergisch-Gladbach (DE); Anke Blume, Weilerswist (DE)

(73) Assignee: Evonik Degussa GmbH, Essen (DE)

( * ) Notice: Subject to any disclaimer, the term of this patent is extended or adjusted under 35 U.S.C. 154(b) by 703 days.

(21) Appl. No.: 12/935,205

(22) PCT Filed: Mar. 19, 2009

(86) PCT No.: PCT/EP2009/053243
§ 371 (c)(1), (2), (4) Date: Sep. 28, 2010

(87) PCT Pub. No.: WO2009/124829
PCT Pub. Date: Oct. 15, 2009

(65) Prior Publication Data
US 2011/0021801 A1     Jan. 27, 2011

(30) Foreign Application Priority Data

Apr. 7, 2008 (DE) .......................... 10 2008 017 747

(51) Int. Cl.
*C07F 7/04* (2006.01)

(52) U.S. Cl.
USPC ........................... 556/467; 556/466; 423/335

(58) Field of Classification Search
USPC .................................. 423/335; 556/466, 467
See application file for complete search history.

(56) References Cited

U.S. PATENT DOCUMENTS

| 2003/0082090 A1 | 5/2003 | Blume et al. |
| 2007/0059232 A1* | 3/2007 | Stenzel et al. ................ 423/335 |

FOREIGN PATENT DOCUMENTS

| CN | 1408640 A | 4/2003 |
| CN | 101139096 A | 3/2008 |
| DE | 103 30 118 | 2/2004 |
| EP | 1 762 544 | 3/2007 |

OTHER PUBLICATIONS

Combined Office Action and Search Report issued May 14, 2013 in Chinese Patent Application No. 200980112250.1 (English translation only).

International Search Report issued Jul. 15, 2009 in PCT/EP09/53243 filed Mar. 19, 2009.

* cited by examiner

*Primary Examiner* — Johann R Richter
*Assistant Examiner* — Pancham Bakshi
(74) *Attorney, Agent, or Firm* — Oblon, Spivak, McClelland, Maier & Neustadt, L.L.P.

(57) ABSTRACT

The present invention relates to precipitated silicic acids, which have a particularly narrow particle size distribution in combination with a special pore size distribution, to a method for the production thereof, and to the use thereof as a filler for rubber mixtures.

23 Claims, 3 Drawing Sheets

Figure 1:
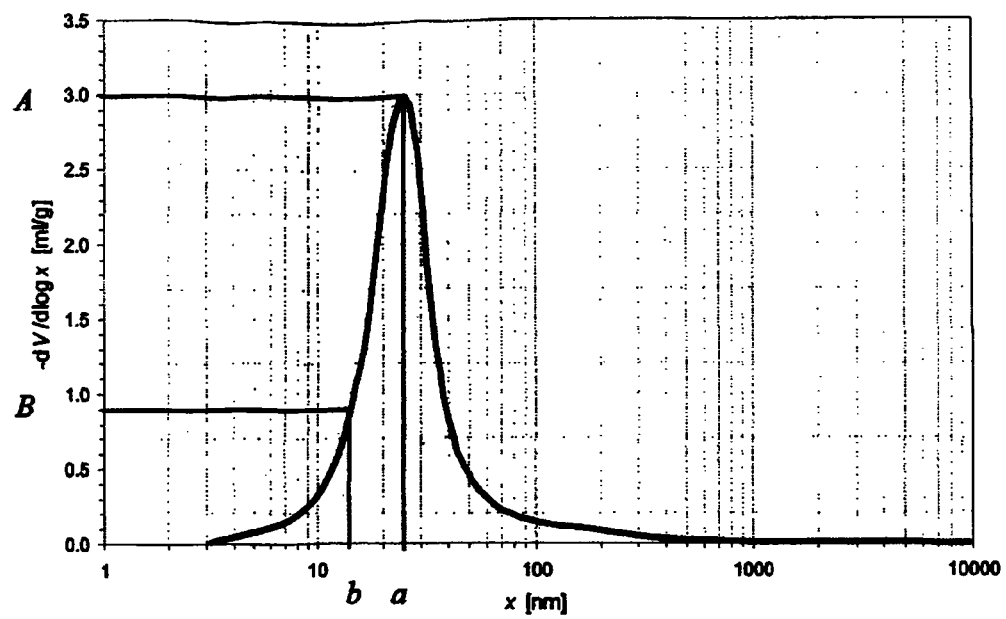

Typical curve profile of the negative logarithmic derivative of the cumulated pore volume $V$ with respect to the pore diameter $x$ with the features $a$, $b$, $A$ and $B$.

Example of the straight line of the n-alkanes for determining the morphology index.

Showing the specific pore surface distribution A(r) and its integral B(r).

PRECIPITATED SILICAS AS A REINFORCING FILLER FOR ELASTOMER MIXTURES

The present invention relates to precipitated silicas which have a particularly narrow particle size distribution in combination with a particular pore size distribution, to a process for preparing them and to the use thereof as a filler for rubber mixtures.

The use of precipitated silicas in elastomer mixtures, for example tire tread mixtures, has been known for a long time. High demands are made for the use of silicas as a reinforcing filler in rubber mixtures, as used, inter alia, to produce pneumatic tires and industrial rubber articles. They should be readily and efficiently incorporable and dispersible in the rubber and, in conjunction with a coupling reagent, preferably a bifunctional organosilicon compound, enter into a chemical bond with the rubber, which leads to a desired high and homogeneous reinforcement of the rubber mixture. In the case of high performance tires, silicas are used in order to achieve good properties with regard to wet skidding, rolling resistance, handling and abrasion performance. In the case of prior art silicas, for example according to EP 0520862 B1, EP 0670813 B1 and EP 917519 B1, attempts are made to solve the problem of abrasion performance by virtue of a particularly good dispersibility of the silicas. However, it has been found that a good dispersibility alone is insufficient to solve the problem satisfactorily.

The person skilled in the art is aware that low molecular weight compounds, for example bifunctional organosilicon compounds and vulcanization accelerants, can be physi- and/or chemisorbed into the pores of the silica and hence can fulfill their function as rubber adhesion promoters and vulcanization accelerants for rubber crosslinking only to a limited degree, if at all.

The person skilled in the art is additionally aware that the coupling reagent, typically a bifunctional organosilicon compound known from (S. Wolff, "Chemical Aspects of Rubber Reinforcement by Fillers", Rubber Chem. Technol. 69, 325 (1996)), is intended to very substantially homogeneously and quantitatively modify the rubber-active surface of the silica. The modification can be effected by a precoverage of the silica in substance or solution/suspension (ex situ) (U. Görl, R. Panenka, "Silanisierte Kieselsäuren—Eine neue Produktklasse für zeitgemäße Mischungsentwicklung" [Silanized silicas—a new product class for modern-day mixture development], Kautsch. Gummi Kunstst. 46, 538 (1993)) or else during the mixing process (in situ) (H. D. Luginsland, "Processing of Silica/Silane-Filled Tread Compounds", paper No. 34 presented at the ACS Meeting, Apr. 4-6, 2000, Dallas, Tex., USA), in situ modification being the preferable and also typically employed method. In order to ensure a rapid and quantitative silanization of the rubber-active surface, it is necessary to enrich the surface in a controlled manner with reactive silanol groups to which the organosilicon compound can be attached. A moisture content of >4% is needed in order to ensure a rapid and complete silanization of the silica surface with an organosilicon compound (U. Görl, A. Hunsche, A. Müller, H. G. Koban, "Investigations into the Silica/Silane Reaction System", Rubber Chem. Technol. 70, 608 (1997)).

The problems of abrasion performance and of attachment of the coupling agent to the silica still have not been solved optimally. There is therefore a need for novel reinforcing silicas for elastomer mixtures which have the abovementioned disadvantages of the known reinforcing silicas only to a reduced degree, if at all, and optimally simultaneously still have the advantages of the already known reinforcing silicas.

It was therefore an object of the present invention to provide novel precipitated silicas which can be incorporated efficiently into elastomer mixtures and, compared to the prior art precipitated silicas, exhibit improved performance properties. In addition, a process shall be provided for preparing the corresponding silicas.

Further objects which are not stated explicitly are evident from the overall context of the description, examples and claims.

It has been found, that surprisingly, this object is achieved by the inventive precipitated silicas defined in detail in the description which follows and in the claims and the examples. This is because the inventors have found that, as a result of the preparation of the silicas by known batchwise processes, the homogeneity of the resulting silica, exemplified by its physical/chemical properties, is possible only to a certain degree. They have additionally found that the aim of an improved abrasion performance of reinforced rubber mixtures can be achieved only by means of a very substantially intrinsically homogeneous silica. It has been found to be particularly important that the particle size distribution of the silicas is very narrow and homogeneous and the pore size distribution is simultaneously optimal.

The present invention therefore provides precipitated silicas, characterized in that they have the following physicochemical properties:

| | |
|---|---|
| CTAB surface area | $\geq 150$ m$^2$/g |
| BET surface area: | $\geq 150$ m$^2$/g |
| DBP number | 180-350 g/(100 g) |
| half width/peak | $\leq 0.95$ |
| d 25%/d 75% | 1.00 to 1.80 |
| relative width $\gamma$ (pressed) | $\leq 2.8$ (gnm)/ml |
| fineness value F.V. (pressed): | 100 to 140 Å. |

The present invention further provides, in addition, readily dispersible precipitated silicas, characterized by a morphology index IM of 0.20 to 0.85 and/or a modified Sears number, Vol 2 of 13 to 28 ml/(5 g) and/or a pore volume ratio V2/V1 (pressed) of 0.20 to 0.75 and/or an Al$_2$O$_3$ content of 0.1 to 5.0% by weight.

The inventive precipitated silicas can be used in powder form or preferably in the form of approximately spherical particles or more preferably in granule form.

The present invention further provides a process for producing the inventive precipitated silicas according to any one of Claims 12-20.

The present invention further provides for the use of the inventive precipitated silicas in elastomer mixtures, vulcanizable rubber mixtures and/or other vulcanizates, such as pneumatic tires, tire treads, cable sheaths, hoses, drive belts, conveyor belts, V-belts, roll coverings, tires, shoe soles, gaskets and damping elements.

The invention additionally provides elastomer mixtures, vulcanizable rubber mixtures or other vulcanizates, and also tires, which comprise the inventive silicas.

Compared to the prior art precipitated silicas, the inventive precipitated silicas have a particularly homogeneous and narrow particle size distribution, determined by means of a disc centrifuge, in combination with a particular pore size distribution, determined by means of mercury porosimetry. Moreover, the inventive silicas have good to very good dispersibility. The inventors are of the view that, without being bound to a particular theory, specifically this combination enables homogeneous reinforcement over the entire rubber matrix, which results especially in an improved abrasion performance of the finished rubber article.

The width of the particle size distribution is characterized by the parameter "half width/peak", and the homogeneity by the "d 25%/d 75%" ratio of the weight distribution curve, determined by the methodology described below by means of a disc centrifuge. The particular mercury porosimetry distribution is represented by the parameters "relative width γ (pressed)" and "fineness value F.V. (pressed)", determined by the methodology described below. The sufficiently high DBP ensures good dispersibility.

Overall, these properties of the inventive silicas lead to a very balanced rubber performance, with particular strengths in the abrasion values and in the performance under dynamic stress.

The inventors have found that the effect of the optimized-homogeneity silica can be supported by a rough surface of the silica, quantifiable by means of the morphology index IM. Without being bound to a particular theory, the inventors are of the view that the attachment of the silica surface for the rubber and in particular for the coupling reagents is improved by the rough surface. The inventive silicas thus lead not just to an improved abrasion performance but also to an improved and accelerated attachment of the coupling agent.

The combination of the features mentioned leads to the effect that the inventive precipitated silicas are outstandingly suitable as a reinforcing filler for elastomers. The inventive precipitated silicas are notable for a greatly improved overall performance compared to the prior art. This is shown in particular in an improved abrasion performance and an improved dynamic performance. It has thus been possible to solve the conflicting aims in a tire tread mixture between improved abrasion performance coupled with equivalent or improved wet grip. In addition, an increased dynamic viscosity is found at high temperatures, which leads to improved ride quality of a tread filled with these silicas.

The subjects of the invention are described in detail hereinafter.

In the present invention, the terms silica, reinforcing silicas and precipitated silica are used synonymously.

The inventive silicas have a specific pore structure, which is characterized by means of mercury porosimetry. Since silicas may be present in various dosage forms—for example in the form of powders, essentially spherical particles or granules—a mechanical pressure treatment of the silica must be effected beforehand in order to obtain a measurement substantially independent of the dosage form. The parameters "relative width γ (pressed)" and "fineness value F.V. (pressed)" determined by means of mercury porosimetry and claimed in the claims are therefore suffixed with "pressed" in brackets in order to make clear that these parameters have been measured on a silica which has been subjected to a pressure treatment before the performance of the mercury porosimetry—as specified in the description of the test methods.

As already indicated above, the pressure treatment is necessary in order to make the parameter substantially independent of the dosage form of the silica and hence to determine the "true" value of the silica which is relevant in performance terms and not that distorted by the dosage form.

The fineness value F.V. represents the mean radius of the intra-aggregate pores. The fineness value is as shown in detail in the description of the test methods and also in FIG. 3. The inventors have found that, surprisingly, a fineness value F.V. (pressed) within a range of 100 to 140 Å and preferably 100 to 130 Å, is needed for homogeneous reinforcement.

The inventive silicas have a narrow pore size distribution of the pores with a pore diameter less than that of the maximum of the derivative of the pore volume distribution function, which is determined by means of mercury porosimetry. Since silicas may be present in various dosage forms—for example in the form of powders, essentially spherical particles or granules—here too, a mechanical pressure treatment of the silica must be effected beforehand in order to obtain a measurement substantially independent of the dosage form.

The pore volume determined by means of mercury porosimetry is evaluated within the range of 3.5 nm to 5 μm. To this end, an algorithm is applied to the data of the negative logarithmic derivative of the cumulative pore volume, which first determines the most common characteristic pore diameter. This is typically in the range of 10 to 100 nm. The further evaluation proceeds from this value according to the information in the experimental section. This provides a relative width γ (pressed) of the pore size distribution, which takes account of unsymmetrical pore size distributions. The relative width γ (pressed) is thus a characteristic feature which is substantially independent of the dosage form and can be determined with good reproducibility, which describes only the pores which have a smaller diameter than the most common pores (cf. FIG. 1). This pore size range corresponds predominantly to the pore volume between the primary particles which have fused to form silica aggregates and allows a statement about their aggregation. The relative width γ (pressed) of the inventive silicas is very narrow, and so only slight variations between the particles are found. Without being bound to a particular theory, the inventors are of the opinion that this is an essential prerequisite for homogeneous and uniform reinforcement and hence good abrasion. The relative width γ (pressed) of the pore size distribution is <2.8 (gnm)/ml, preferably in the range from 1.0 to 2.7 (gnm)/ml, more preferably from 1.3 to 2.6 (gnm)/ml and most preferably from 1.5 to 2.5 (gnm)/ml, and from 1.7 to 2.4 (gnm)/ml.

It has been found to be a further important prerequisite for improved abrasion that the inventive silicas must have a narrow and homogeneous particle size distribution. The width of the particle size distribution, determined by means of a disc centrifuge, is characterized by the half-height width of the peak normalized to the position of the peak (half width/peak) and the homogeneity by the quotient d 25%/d 75%. The theoretically maximum possible homogeneity would accordingly be at a value of 1.0. The more closely this ratio approaches 1.0 the better, i.e. the more homogeneous the silica is.

The inventive silicas therefore have a half-height width of the peak normalized to the position of the peak (half width/peak) of ≤0.95, preferably ≤0.90, more preferably 0.50 to 0.90 and especially preferably 0.65 to 0.90.

In addition, the inventive silicas have a homogeneity ratio d 25%/d 75% of 1.00 to 1.80, preferably 1.20 to 1.80, more preferably 1.30 to 1.80 and most preferably 1.40 to 1.75.

A high specific CTAB surface area is a prerequisite for a sufficiently good reinforcement potential. The inventive precipitated silicas therefore have a CTAB surface area of ≥150 m$^2$/g, preferably of 160 to 220 m$^2$/g, more preferably of 160 to 190 m$^2$/g and most preferably of 165 to 185 m$^2$/g.

The specific BET surface area (cf. S. Brunauer, P. H. Emmett, E. Teller, "Adsorption of Gases in Multimolecular Layers", J. Am. Chem. Soc. 60, 309 (1938)) describes the influence of the silica on the incorporation behavior into the rubber, the crude mixture properties and the vulcanization kinetics. In a further specific embodiment, the inventive silicas have a BET surface area of ≥150 m$^2$/g, preferably of 150 to 220 m²/g, more preferably of 160 to 210 m²/g and most preferably of 165 to 195 m²/g.

The sufficiently high DBP ensures sufficiently good dispersibility. The inventive silicas therefore have a DBP of 180 to 350 g/(100 g), preferably of 180 to 300 g/(100 g) and of 190 to 290 g/(100 g), more preferably of 200 to 280 g/(100 g) and most preferably of 210 to 270 g/(100 g). In a preferred embodiment, the DBP number is 200 to 350 g/(100 g), more preferably 210 to 350 g/(100 g), even more preferably 220 to 350 g/(100 g), especially preferably 230 to 320 g/(100 g) and very especially preferably 240 to 290 g/(100 g) for powder and approximately spherical particles (microgranule). In another preferred embodiment, the DBP number is 180 to 300 g/(100 g), more preferably 190 to 280 g/(100 g), even more preferably 200 to 260 g/(100 g), especially preferably 210 to 250 g/(100 g) and especially preferably 210 to 240 g/(100 g) for granules.

The roughness of the surface of the inventive silicas is described by the morphology index IM. Inverse gas chromatography (IGC), which is frequently employed for the characterization of silica powders, can also serve, under infinitely dilute conditions (IGC-DI, DI=at infinite dilute conditions) to determine the surface roughness.

IGC-DI requires the measurement of the net retention times (the time that a substance spends in the column filled with silica, compared to the corresponding time of the relatively uninteractive methane sample) of dissolved substances which are injected in very small amounts. Under these conditions, the intermolecular interactions of the substances can be neglected.

The variation of the free adsorption energy of the sample ($\Delta G_a$) is in the following relationship to the retention volume ($V_G$):

$$\Delta G_a(\text{sample}) = -RT \cdot \ln(V_G)$$

(free adsorption energy $\Delta G_a$ in [kJ/mol], universal gas constant R=8.31441 [J/(K mol)], temperature in [K], ln (natural logarithm), magnitude of the retention volume $V_G$ in [ml]

$V_G$ is calculated as follows, as a function of the flow rate ($D_c$) of the carrier gas (helium) and of the measured net retention time ($t_N$):

$$V_G = D_c \cdot t_N$$

(flow rate in [ml/min], net retention time in [min])

The corrected flow rate $D_c$ is determined with the aid of the James-Martin gas compressibility correction factor (see J. R. CONDER, C. L. YOUNG, "*Physico-Chemical Measurement by Gas Chromatography*", Wiley, New-York, 26-32 (1979)) from the flow rate of the mobile phase, which is normally determined at the outlet of the column.

When the free enthalpy ($\Delta G_a$) is plotted against the number of carbon atoms for a series of n-alkanes, a linear relationship as shown in FIG. 1 can be found. $\Delta G_a$ (CH$_2$) is the slope of the straight line and constitutes the free adsorption energy of a single CH$_2$ group Nc is the number of carbon atoms. This is true for all filled columns under all processing conditions.

The surface roughness was estimated by comparing the behavior of branched and cyclic alkane samples with those of n-alkanes.

The determination method of the surface morphology of solids is based on the topology index concept of molecules ($\chi_T$) developed by E. Brendle and E. Papirer (see E. BRENDLE, E. PAPIRER, *J. Colloid Interface Sci.* 194, 207-216 (1997), "*A new topological index for molecular probes used in inverse gas chromatography for the surface nanorugosity evaluation*"). Topology indices take account of the form (geometry) of the molecules and give information about their van der Waals volumes. The $\chi_T$ values for some molecules which are used as standards in IGC are reported in table 1.

TABLE 1

$\chi_T$ values for linear and branched alkanes.

| Samples | $\chi_T$ |
|---|---|
| Linear alkanes | |
| n-pentane | 5 |
| n-hexane | 6 |
| n-heptane | 7 |
| n-octane | 8 |
| n-nonane | 9 |
| n-decane | 10 |
| Branched alkanes | |
| 2,2,4-trimethylpentane | 7.40 |
| 2,2-dimethylhexane | 7.58 |
| cyclooctane | 8.32 |

The morphology index (IM) is the quotient of the retention volume of a branched alkane molecule ($V_G(M)$) and the retention volume of an n-alkane with the same $\chi_T$ ($V_G(C)$).

$$IM(\text{branched sample}) = \frac{V_G(M)}{V_G(C)}$$

The reference for the accessibility to the solid surface is the straight line of the n-alkanes.

The equation of this straight line is as follows:

$$\Delta Ga(V_G) = \Delta Ga(CH2) \cdot \chi_T + b$$

When the accessibility of the branched alkanes to the solid surface is identical to that of the n-alkanes, the branched alkanes are then on the straight line of the n-alkanes. In other words, ($V_G(C)$) is determined in this manner:

$$\Delta Ga(V_G(C)) = \Delta Ga(CH2) \cdot \chi_{T(\text{branched alkane molecule})} + b.$$

Proceeding from the free adsorption energy, the ratio has the following appearance:

$$IM(\text{branched sample}) = \exp\frac{\Delta G_a(M)}{\Delta G_a(C)}$$

This method gives information about the accessibility of the branched sample to the surface and indicates possible size exclusion effects.

When the free adsorption enthalpies of linear and branched alkanes are compared, it is found that the accessibility of the sample to the surface in the case of branched (or cyclic) alkanes is identical to that of n-alkanes when the representative point of a branched (or cyclic) alkane is present on the straight line of the n-alkanes. This means that the surface, viewed at the molecular level, is smooth. n-Alkanes and branched alkanes have the same accessibility to the surface, and the corresponding IM value is 1.

When the representative point of a branched (or cyclic) alkane is below the straight line of the n-alkanes, the accessibility of this sample to the solid surface is lower than that of the n-alkanes. The surface is therefore rough. This surface roughness and the sterically more demanding structure of the branched or cyclic alkanes consequently lower the surface accessibility thereof. Accordingly, the interactions between the surface and the branched or cyclic alkanes are reduced and the corresponding IM values are less than 1.

In a preferred embodiment, the inventive silicas, as already explained, are notable for a particularly high roughness of the surface and hence particularly good binding of the coupling agent. The morphology index of the inventive silicas (IM) is 0.20 to 0.85, preferably 0.30 to 0.80, more preferably 0.40 to 0.80 and most preferably 0.50 to 0.80.

The attachment capacity of the coupling agent can be improved even further when a sufficiently high number of silanol groups is present on the surface, since the silanol groups constitute the attachment sites for the coupling agent. In a further preferred embodiment, the inventive silicas therefore have a modified Sears number, Vol 2, of 13 to 30 ml/(5 g), preferably 15 to 29 ml/(5 g), more preferably 17 to 28 ml/(5 g) and most preferably 23 to 27 ml/(5 g).

The mercury pore volume V1 corresponds to the pore volume of the pores having a diameter of <400 Å, which—as has been found—have a significant effect on the reinforcement. In the case of the inventive silicas, it has been found that it is advantageous when a significant portion of this pore volume (V2) is formed by pores having a diameter of 175 to 275 Å. If this is the case and if, as described above, the relative width γ (pressed) of the pores and the fineness value F.V. (pressed) are within the ranges specified in Claim 1, particularly good abrasion values have been found, such that the inventive silicas preferably have a pore volume ratio V2/V1 (pressed) of 0.20 to 0.75, more preferably 0.25 to 0.6, most preferably 0.30 to 0.60 and especially preferably of 0.3 to 0.55.

In a specific embodiment of the present invention, the inventive silica contains aluminum, the aluminum content in the form of $Al_2O_3$ being within the range of 0.1 to 5% by weight, preferably of 0.1 to 2% by weight, more preferably of 0.2 to 1% by weight and most preferably of 0.3 to 0.8% by weight. The inventors have found that, surprisingly, the increased aluminum content improves the crude mixture properties of a rubber mixture filled with such a silica. For instance, a low torque minimum in the MDR (vulcanization isotherm) test and a more rapid and therefore improved vulcanization behavior are found. Thus, the advantages of the inventive silicas with less than 0.1% by weight of $Al_2O_3$ can be supplemented with further advantages over prior art silicas by virtue of the $Al_2O_3$ addition.

The inventive precipitated silicas may be present in various dosage forms, for example in the form of a powder with a particle size $d_{50}$ determined by means of laser diffraction of 1 to 80 μm. The pulverulent particles may have an irregular or else a regular outer form, i.e. they may, for example, also be essentially spherical. The inventive precipitated silicas are preferably in the form of essentially spherical particles (microgranule) with a particle size $d_{50}$, determined by means of screen residue determination (Alpine) of 80 μm to 1000 μm. In the latter case, the inventive silicas are preferably prepared by means of spray tower drying, as described in EP 0937755, and exhibit an outer form characteristic of this drying method (see figures in EP 0937755). The content of EP 0937755 is hereby incorporated explicitly into the content of the present application. More preferably, the inventive precipitated silicas are present in the form of granules ($d_{50}$>1000 μm (Alpine screen residue)), and have, after granulation, such a particle size distribution that, by means of the screen residue determination (Ro-Tap), at least 80% by weight of the particles are larger than 300 μm and not more than 10% by weight are smaller than 75 μm. It has been found that, surprisingly, the dosage form as a granule is particularly suitable in order to preserve the effects obtained by virtue of the rough surface, of the inventive silicas, such that they are not lost as a result of transport.

The preferred ranges specified can be established independently of one another.

The inventive silicas can be prepared by a process which likewise forms part of the subject-matter of the present invention. This process comprises the steps of a) initially charging an aqueous solution of an alkali metal or alkaline earth metal silicate and/or an organic and/or inorganic base b) simultaneously metering at least one alkali metal and/or alkaline earth metal silicate and at least one acidifier into this initial charge with stirring at 75 to 88° C. for 60 to 120, preferably 70 to 90, minutes, c) optionally continuing the addition of the acidifier used in step b) and/or of another acidifier, with the same or a different metering rate from that in step b), until a pH of the precipitate suspension of 7 to 10 has been attained and continuing to stir the resulting suspension at this pH for 40 to 80 minutes, at high temperatures of 80 to 98° C.

d) reacidifying with at least one acidifier to a pH of about 5 to about 8 e) reacidifying with at least one acidifier to a pH of 4 to 5, the metering rate of the acidifier being less than in step d).

f) filtering the precipitate suspension g) washing the filtercake h) optionally liquefying the filtercake i) drying j) optionally grinding and/or granulating.

The initial charge in step a) of the process according to the invention may be approx. 20, 30, 40, 50, 60, 70, 80 or 90% of the final volume of the precipitate. The basic compounds added to the initial charge are especially selected from the group of the alkali metal hydroxides, alkaline earth metal hydroxides, alkali metal carbonates, alkali metal hydrogencarbonates and alkali metal silicates. Preference is given to using waterglass and/or sodium hydroxide solution. The pH of the initial charge is between 7 and 14, preferably between 10 and 11.

The addition of at least one alkali metal silicate and/or alkaline earth metal silicate and at least one acidifier during step b) is preferably effected in such a way that the precipitation proceeds at a constant alkali number of 15 to 40, more preferably 15 to 25.

During the simultaneous addition of the alkali metal silicate and/or alkaline earth metal silicate in step b), the reaction mixture is stirred intimately. In a particularly preferred embodiment of the process according to the invention, the reaction solution in step b) and/or c) is not just stirred, but shear energy is additionally introduced by means of a shearing unit, in order to further improve the dispersibility of the particles obtained.

After step b), in the process according to the invention, the alkali metal silicate and/or alkaline earth metal silicate is stopped.

During one or more of steps a) to j), an optional addition of organic or inorganic salts can optionally be effected. This can be carried out in solution or as a solid, in each case continuously over the addition time of the waterglass and of the acidifier, or as a batch addition. It is also possible to dissolve the salts in one or both components and then to add them simultaneously therewith.

The organic salts used are preferably alkali metal or alkaline earth metal salts. In particular, it is possible to use all combinations of the following ions:

Li$^+$, Na$^+$, K$^+$, Rb$^+$, Be$^{2+}$, Mg$^{2+}$, Ca$^{2+}$, Sr$^{2+}$, Ba$^{2+}$, H$^+$, F$^-$, Cl$^-$, Br$^-$, I$^-$, SO$_3^{2-}$, SO$_4^{2-}$, HSO$_4^-$, PO$_3^{3-}$, PO$_4^{3-}$, NO$_3^-$, NO$_2^-$, CO$_3^{2-}$, HCO$_3^-$, OH$^-$, TiO$_3^{2-}$, ZrO$_3^{2-}$, ZrO$_4^{4-}$, AlO$_2^-$, Al$_2$O$_4^{2-}$, BO$_4^{3-}$.

Suitable organic salts are the salts of formic acid, acetic acid and propionic acid. Cations include the alkali metal or alkaline earth metal ions mentioned. The concentration of these salts in the solution added may be 0.01 to 5 mol/l. The inorganic salt used is preferably Na$_2$SO$_4$.

It is possible to supply the acidifiers in steps b) to d) in the same way or in different ways, i.e. with the same or different concentration and/or feed rate.

Analogously, it is also possible to supply the alkali metal silicate and/or alkaline earth metal silicate to the reaction in the same way or in different ways in steps a) and b).

The alkali metal silicate and/or alkaline earth metal silicate used may, as well as waterglass (sodium silicate solution), also be other silicates, such as potassium silicate or calcium silicate. The acidifiers used may, as well as sulfuric acid, also be other acidifiers such as HCl, HNO$_3$, H$_3$PO$_4$ or CO$_2$.

Filtration, liquefaction (for example according to DE 2447613) and long- or short-term drying of the inventive silicas in steps f) to i) are familiar to those skilled in the art and can be looked up, for example, in the documents cited in this description. The filtration and the washing of the silica are preferably effected in such a manner that the conductivity of the end product is <2000 μS/cm and particularly <1300 μS/cm (4% by weight suspension in water).

Preferably, the washed filtercake, after step g), is liquefied in step h) by adding water and/or at least one acidifier and then dried. In the course of this liquefaction, in a specific embodiment of the present invention, aluminum, preferably in the form of an aluminate, more preferably in the form of sodium aluminate, can be added during the liquefaction. This allows an increased aluminum content in the resulting precipitated silica to be achieved.

Preferably, the inventive silica is dried in a stream drier, spray drier, staged drier, belt drier, rotary tube drier, flash drier, spin-flash drier or spray tower. These drying variants include operation with an atomizer, a one- or two-fluid nozzle, or an integrated fluidized bed. Spray drying can be carried out, for example, according to U.S. Pat. No. 4,094,771. Spray tower drying can be carried out, for example, as described in EP 0937755. The contents of U.S. Pat. No. 4,094,771 and of EP 0 937755 are hereby incorporated explicitly into the content of the present application.

The drying may optionally be followed by grinding and/or granulation with a roll compactor. After the drying step or the grinding, the inventive precipitated silica is preferably present in the form of a powder with a particle size d$_{50}$ determined by means of laser diffraction of 1 to 80 μm. The pulverulent particles may have an irregular or else a regular outer form, i.e. they may, for example, also be approximately spherical particles.

More preferably, the inventive precipitated silicas, after spray tower drying, are in the form of approximately spherical particles (microgranule) with a particle size d$_{50}$, determined by means of screen residue determination (Alpine), of 80 μm to 1000 μm. In the latter case, the inventive silicas are preferably prepared by means of nozzle tower drying, as described in EP 0937755, and exhibit an outer form characteristic of this drying method (see figures in EP 0937755). The content of EP 0937755 is hereby incorporated explicitly into the content of the present application. Most preferably, the inventive precipitated silicas are in the form of granules (d$_{50}$>1000 μm (Alpine screen residue)) and have, after granulation, such a particle size distribution that, by means of screen residue determination (Ro-Tap), at least 80% by weight of the particles are larger than 300 μm and at most 10% by weight are smaller than 75 μm.

It has been found that spin-flash drying with subsequent roller granulation is very particularly suitable for preparing the inventive silicas with a rough surface. The granulation can be carried out, for example, with a WP 50N/75 roller press from Alexanderwerk AG, Remscheid. Preferably, the pulverulent product, without any further addition of binders or liquids, via a horizontal introduction system with a single screw, is vented by means of a vacuum system and introduced homogeneously between the vertically arranged rollers mounted on both sides. This presses the powder to a slug which is converted to the desired maximum granule size by means of a crusher.

The present invention further provides for the use of the inventive silicas in and/or for preparation of elastomer mixtures, vulcanizable rubber mixtures and/or other vulcanizates, such as pneumatic tires, tire treads, cable sheaths, hoses, drive belts, conveyor belts, V-belts, roll coverings, other tires, shoe soles, gaskets and damping elements.

The invention therefore further provides elastomer mixtures, vulcanizable rubber mixtures and/or other vulcanizates which contain the inventive silica, for example moldings such as pneumatic tires, tire treads, cable sheaths, hoses, drive belts, conveyor belts, roll coverings, other tires, shoe soles, gaskets and damping elements.

Optionally, the inventive silica can be modified with silanes or organosilanes of the formulae I to III $$[SiR^1{}_n(RO)_r(Alk)_m(Ar)_p]_q[B] \quad (I),$$

$$SiR^1{}_n(RO)_{3-n}(alkyl) \quad (II),$$

or $$SiR^1{}_n(RO)_{3-n}(alkenyl) \quad (III),$$

in which

B: —SCN, —SH, —Cl, —NH$_2$, —OC(O)CHCH$_2$, —OC(O)C(CH$_3$)CH$_2$ (when q=1) or —S$_w$— (when q=2), where B is chemically bonded to Alk, R and R$^1$: aliphatic, olefinic, aromatic or arylaromatic radical having 2-30 carbon atoms, which may optionally be substituted by the following groups: hydroxyl, amino, alkoxide, cyanide, thiocyanide, halogen, sulfonic acid, sulfonic ester, thiol, benzoic acid, benzoic ester, carboxylic acid, carboxylic ester, acrylate, methacrylate, organosilane radical, where R and R$^1$ may have an identical or different definition or substitution, n: 0, 1 or 2, Alk: a divalent unbranched or branched hydrocarbon radical having 1 to 6 carbon atoms, m: 0 or 1, Ar: an aryl radical having 6 to 12 carbon atoms, preferably 6 carbon atoms, which may be substituted by the following groups: hydroxyl, amino, alkoxide, cyanide, thiocyanide, halogen, sulfonic acid, sulfonic ester, thiol, benzoic acid, benzoic ester, carboxylic acid, carboxylic ester, organosilane radical, p: 0 or 1, with the proviso that p and n are not both 0, q: 1 or 2, w: a number from 2 to 8, r: 1, 2 or 3, with the proviso that r+n+m+p=4, alkyl: a monovalent unbranched or branched saturated hydrocarbon radical having 1 to 20 carbon atoms, preferably 2 to 8 carbon atoms, alkenyl: a monovalent unbranched or branched unsaturated hydrocarbon radical having 2 to 20 carbon atoms, preferably 2 to 8 carbon atoms.

It is also possible to modify the inventive silica with organosilicon compounds of the composition $SiR^2_{4-n}X_n$ (where n=1, 2, 3, 4), $[SiR^2_xX_yO]_z$ (where 0≤x≤2; 0≤y≤2; 3≤z≤10, where x+y=2), $[SiR^2_xX_yN]_z$ (where 0≤x≤2; 0≤y≤2; 3≤z≤10, where x+y=2), $SiR^2_nX_mOSiR^2_oX_p$ (where 0≤n≤3; 0≤m≤3; 0≤o≤3; 0≤p≤3, where n+m=3, o+p=3), $SiR^2_nX_mNSiR^2_oX_p$ (where 0≤n≤3; 0≤m≤3; 0≤o≤3; 0≤p≤3, where n+m=3, o+p=3), $SiR^2_nX_m[SiR^2_xX_yO]_zSiR^2_oX_p$ (where 0≤n≤3; 0≤m≤3; 0≤x≤2; 0≤y≤2; 0≤o≤3; 0≤p≤3; 1≤z≤10 000, where n+m=3, x+y=2, o+p=3). These compounds may be linear, cyclic and branched silane, silazane and siloxane compounds. $R^2$ may be substituted and/or unsubstituted alkyl and/or aryl radicals which have 1-20 carbon atoms and may be substituted by functional groups such as the hydroxyl group, the amino group, polyethers such as ethylene oxide and/or propylene oxide, and halide groups such as fluoride. $R^2$ may also contain groups such as alkoxy, alkenyl, alkynyl and aryl groups, and sulfur-containing groups. X may be reactive groups such as silanol, amino, thiol, halogen, alkoxy, alkenyl groups, and a hydrogen radical.

Preference is given to using linear polysiloxanes of the composition $SiR^2_nX_m[SiR^2_xX_yO]_zSiR^2_oX_p$ (where 0≤n≤3; 0≤m≤3; 5≤x≤2; 0≤y≤2; 0≤o≤3; 0≤p≤3; 1≤z≤10 000, where n+m=3; x+y=2; o+p=3), in which $R^2$ is preferably represented by methyl.

Particular preference is given to using polysiloxanes of the composition $SiR^2_nX_m[SiR^2_xX_yO]_zSiR^2_oX_p$ (where 0≤n≤3; 0≤m≤1; 0≤x≤2; 0≤y≤2; 0≤o≤3; 0≤p≤1; 1≤z≤1000, where n+m=3, x+y=2, o+p=3), in which $R^2$ is preferably represented by methyl.

The modification of the optionally granulated, ungranulated, ground and/or unground precipitated silica with one or more of the organosilicon compounds mentioned can be effected in mixtures with 0.5 to 50 parts, based on 100 parts of precipitated silica, especially 1 to 15 parts, based on 100 parts of precipitated silica, the reaction between precipitated silica and organosilicon compound being performable during the mixture preparation (in situ) or outside by spraying and subsequent heat treatment of the mixture, by mixing the organosilicon compound and the silica suspension with subsequent drying and heat treatment (for example according to DE 3437473 and DE 19609619), or by the process described in DE 19609619 or DE Patent 4004781.

Suitable organosilicon compounds are in principle all bifunctional silanes which can firstly accomplish coupling to the silanol group-containing filler and secondly coupling to the polymer. Amounts of the organosilicon compounds typically used are 1 to 10% by weight based on the total amount of precipitated silica.

Examples of these organosilicon compounds are: bis(3-triethoxysilylpropyl)tetrasulfane, bis(3-triethoxysilylpropyl)disulfane, vinyltrimethoxysilane, vinyltriethoxysilane, 3-mercaptopropyltrimethoxysilane, 3-mercaptopropyltriethoxysilane, 3-aminopropyltrimethoxysilane, 3-aminopropyltriethoxysilane. Further organosilicon compounds are described in WO 99/09036, EP 1108231, DE 10137809, DE 10163945, DE 10223658.

In a preferred embodiment of the invention, the silane used may be bis(triethoxysilylpropyl)tetrasulfane.

The inventive silica can be incorporated into elastomer mixtures, tires or vulcanizable rubber mixtures as a reinforcer filler in amounts of 5 to 200 parts, based on 100 parts of rubber, as a powder, approximately spherical particles or a granule, either with silane modification or without silane modification.

Rubber and elastomer mixtures are considered to be equivalent in the context of the present invention.

In addition to mixtures which contain exclusively the inventive silicas with and without the organosilicon compounds mentioned, the elastomer or rubber mixtures may additionally be filled with one or more more or less reinforcing fillers.

As further fillers, the following materials may be used:
carbon blacks: the carbon blacks for use here are produced by the lamp black, furnace black or gas black methods and possess BET surface areas of 20 to 200 m$^2$/g, for example SAF, ISAF, HSAF, HAF, FEF or GPF blacks. The carbon blacks may optionally also contain heteroatoms, for example silicon.
High-dispersity fumed silicas, produced, for example, by flame hydrolysis of silicon halides. The silicas may optionally also be present as mixed oxides with other metal oxides, such as oxides of aluminum, magnesium, calcium, barium, zinc and titanium.
Further commercial silicas
synthetic silicates, such as aluminum silicate, alkaline earth metal silicates such as magnesium silicate or calcium silicate, with BET surface areas of 20 to 400 m$^2$/g and primary particle diameters of 10 to 400 nm
synthetic or natural aluminum oxides and hydroxides
natural silicates, such as kaolin, other naturally occurring silicon dioxide compounds
glass fibers and glass fiber products (mats, strands) or glass microbeads
starch and modified starch types
natural fillers, for example clays and silica chalk.

Here too, as in the case of the metered addition of the organosilicon compounds, the blending ratio is guided by the property profile of the finished rubber mixture which is to be achieved. A ratio of 5-95% between the inventive silicas and the other abovementioned fillers (including as a mixture) is conceivable and is also implemented in this context.

In a particularly preferred embodiment, 10 to 150 parts by weight of silicas, consisting completely or partially of the inventive silica, optionally together with 0 to 100 parts by weight of carbon black, and 1 to 20 parts by weight of an organosilicon compound, based in each case on 100 parts by weight of rubber, can be used to produce the mixtures.

In addition to the inventive silicas, the organosilicon compounds and other fillers, the elastomers constitute a further important constituent of the rubber mixture. Mention should be made in this context of elastomers, natural and synthetic, oil-extended or not, as individual polymers or blends with other rubbers, for example natural rubbers, polybutadiene (BR), polyisoprene (IR), styrene/butadiene copolymers having styrene contents of 1 to 60 and preferably 2 to 50% by weight (SBR), especially prepared by means of the solution polymerization method, butyl rubbers, isobutylene/isoprene copolymers (IIR), butadiene/acrylonitrile copolymers with acrylonitrile contents of 5 to 60 and preferably 10 to 50% by weight (NBR), partly hydrogenated or fully hydrogenated NBR rubber (HNBR), ethylene/propylene/diene copolymers (EPDM), and mixtures of these rubbers.

In addition, the following additional rubbers are useful for rubber mixtures with the rubbers mentioned: carboxyl rubbers, epoxide rubbers, trans-polypentenamers, halogenated butyl rubbers, rubbers formed from 2-chlorobutadiene, ethylene-vinyl acetate copolymers, ethylene-propylene copolymers, and if appropriate also chemical derivatives of natural rubber and modified natural rubbers. Preferred synthetic rubbers are described, for example, in W. Hofmann, "Kautschuktechnologie" [Rubber Technology], Genter Verlag, Stuttgart 1980.

For the production of the inventive tires, especially anionically polymerized L-SBR rubbers (solution SBR) with a glass transition temperature above −50° C. and mixtures thereof with diene rubbers are of interest.

The inventive silicas, with or without an organosilicon compound, may find use in all rubber applications, for example moldings, tires, tire treads, conveyor straps, conveyor belts, gaskets, drive belts, hoses, shoe soles, cable sheaths, roll coverings, damping elements etc.

The incorporation of this silica and the production of the mixtures comprising this silica is effected in the manner customary in the rubber industry on an internal mixer or roller system at preferably 80-200° C. The dosage or use form of the silicas may be as a powder, as approximately spherical particles or as granule. Here too, the inventive silicas are no different from the known light-colored fillers.

The inventive rubber vulcanizates may comprise further rubber assistants in the customary dosages, such as reaction accelerants, ageing stabilizers, thermal stabilizers, light stabilizers, ozone stabilizers, processing assistants, plasticizers, tackifiers, blowing agents, dyes, pigments, waxes, extenders, organic acids, retardants, metal oxides and activators, such as triethanolamine, polyethylene glycol, hexanetriol. These compounds are known in the rubber industry.

The rubber assistants can be used in known amounts which are guided, inter alia, by the end use. Customary amounts are, for example, amounts of 0.1 to 50% by weight, based on the rubber used. The crosslinkers used may be sulfur or sulfur-donating substances. The inventive rubber mixtures may additionally comprise vulcanization accelerants. Examples of suitable main accelerants, individually or in combination, are mercaptobenzothiazoles, sulfeneamides, thiurams, dithiocarbamates in amounts of 0.1 to 3% by weight. Examples of coaccelerants, individually or in combination, are guanidines, thioureas and thiocarbonates, in amounts of 0.1 to 5% by weight. Sulfur may typically be used in amounts of 0.1 to 10% by weight, preferably 1 to 3% by weight, based on the rubber. used.

The inventive silicas can be used in rubbers which are crosslinkable with accelerants and/or sulfur, or else by means of peroxides.

The vulcanization of the inventive rubber mixtures can be effected at temperatures of 100 to 200° C., preferably 130 to 180° C., optionally under a pressure of 10 to 200 bar. The blending of the rubbers with the filler, any rubber assistants and the organosilicon compound can be carried out in known mixing units, such as rollers, internal mixers and mixing extruders.

The inventive rubber mixtures are suitable for producing moldings, for example for the production of pneumatic tires, tire treads for summer, winter and all-year tires, passenger vehicle tires, tires for utility vehicles, motorcycle tires, tire body parts, cable sheaths, hoses, drive belts, conveyor belts, roll coverings, shoe soles, gasket rings and damping elements.

The inventive rubber mixtures are suitable especially for the production of passenger vehicle tire treads (in summer, winter and all-year tires) and motorcycle tire treads, but also for tires for utility vehicles, with reduced rolling resistance coupled with good abrasion resistance.

The inventive rubber mixtures, without addition of organosilicon compounds, in a blend with a typical tire tread carbon black, are also suitable for improving the Cut & Chip performance on tires for construction machinery, agricultural machinery or mining machinery (for a definition and further remarks, see "New insights into the tear mechanism" and references therein, presented at Tire Tech 2003 in Hamburg by Dr. W. Niedermeier).

The reaction conditions and the physical/chemical data of the inventive precipitated silicas are determined by the following methods:

Determination of the Solids Content of Filtercake

This method is used to determine the solids content of filtercake by removing the volatile fractions at 105° C. To this end, 100.00 g of the filtercake are weighed (starting weight E) into a dry, tared porcelain dish (diameter 20 cm). If appropriate, the filtercake is comminuted with a spatula in order to obtain looser lumps of not more than 1 cm$^3$. The sample is dried to constant weight in a drying cabinet at 105±2° C. Subsequently, the sample is cooled to room temperature in a desiccator cabinet with silica gel as the desiccant. The final weight A is determined gravimetrically.

The solids content (SC) in % is determined by $$SC = A/E * 100\%,$$

where A=final weight in g and E=starting weight in g.

Determination of the Solids Content of Precipitated Suspensions

The solids content of the precipitated suspension is determined gravimetrically after filtration of the sample. 100.0 ml of the homogenized precipitated suspension ($V_{suspension}$) are measured at room temperature with the aid of a measuring cylinder. The sample is filtered off by suction in a porcelain suction filter by means of a round filter (type 572, from Schleicher & Schuell), but not suction-dried in order to prevent crack formation in the filtercake. Subsequently, the filtercake is washed with 100.0 ml of distilled water. The washed filtercake is transferred to a tared porcelain dish and dried to constant weight in a drying cabinet at 105±2° C. After cooling to room temperature, the weight of the dried silica ($m_{sample}$) is determined.

The solids content is determined according to:

$$\text{solids content in g/l} = (m_{sample} \text{ in g})/(V_{suspension} \text{ in l}).$$

Determination of the Solids Content of the Silica Feed

The silica feed is dried to constant weight in an IR drier. The drying loss consists predominantly of water moisture, 2.0 g of silica feed are introduced into a tared aluminum dish and the lid of the IR drying unit (from Mettler, LP 16) is closed. After the start button has been pressed, the drying of the suspension at 105° C. commences, and is ended automatically when the decrease in weight per unit time goes below the value of 2 mg/(120 s).

The weight decrease in % is displayed directly by the instrument when the 0-100% mode is selected. The solids content is calculated according to $$\text{solids content in \%} = 100\% - \text{weight decrease in \%}.$$

Determination of the Alkali Number

The alkali number (AN) determination is understood to mean the consumption of hydrochloric acid in ml (at sample volume 50 ml, 50 ml of distilled water and using hydrochloric acid of concentration 0.5 mol/l) in a direct potentiometric titration of alkaline solution, or suspensions up to a pH of 8.30. This detects the free alkali content of the solution or suspension.

The pH instrument (from Knick, Calimatic 766 pH meter with temperature sensor) and the pH electrode (combination electrode from Schott, N7680) are calibrated with the aid of two buffer solutions (pH=7.00 and pH=10.00) at room temperature. The combination electrode is immersed into the test solution or suspension which has been equilibrated to 40° C. and consists of 50.0 ml of precipitated suspension and 50.0 ml of deionized water. Subsequently, hydrochloric acid solution of concentration 0.5 mol/l is added dropwise until a constant pH of 8.30 is established. Owing to the equilibrium between the silica and the free alkali content, which is at first established only slowly, a wait time of 15 min is needed before the acid consumption can finally be read off. Given the amounts and concentrations selected, the hydrochloric acid consumption read off in ml corresponds directly to the alkali number, which is reported dimensionlessly.

Determination of the pH

The pH of the silica is determined as a 5% aqueous suspension at room temperature based on DIN EN ISO 787-9. Compared to the requirements of this standard, the starting weights were altered (5.00 g of silica for 100 ml of deionized water).

Determination of the Electrical Conductivity

The determination of the electrical conductivity of silica is carried out as a 4% aqueous suspension at room temperature based on DIN EN ISO 787-14. Compared to the requirements of this standard, the starting weights were altered (4.00 g of silica for 100 ml of deionized water).

Determination of the Moisture Content

The moisture content of silicas is determined to ISO 787-2 after drying in a forced-air drying cabinet at 105° C. for 2 hours. This drying loss consists predominantly of water moisture.

Determination of the Modified Sears Number, Vol 2 of Silicas

By titrating silica with potassium hydroxide solution in the range from pH 6 to pH 9, it is possible to determine the modified Sears number Vol 2, as a measure of the number of free hydroxyl groups.

The determination method is based on the following chemical reactions, where "Si"—OH is intended to symbolize a silanol group of the silica:

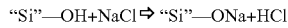

"Si"—OH+NaCl ⇒ "Si"—ONa+HCl

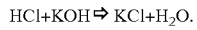

HCl+KOH ⇒ KCl+H$_2$O.

Procedure 10.00 g of a silica in pulverulent form, having approximately spherical particles or in granular form with moisture content 5±1% are comminuted with an IKA universal mill M 20 (550 W; 20 000 rpm) for 60 seconds. In some cases, the moisture content of the starting substance has to be adjusted by drying at 105° C. in a drying cabinet or homogenous moistening, and the comminution has to be repeated. 2.50 g of the silica thus treated are weighed at room temperature into a 250 ml titration vessel and admixed with 60.0 ml of methanol p.A. After complete wetting of the sample, 40.0 ml of deionized water are added, and dispersion is effected by means of an Ultra Turrax T 25 stirrer (KV-18G stirrer shaft, diameter 18 mm) for 30 seconds at a speed of 18 000 rpm. 100 ml of deionized water are used to rinse the sample particles adhering on the vessel wall and stirrer into the suspension, which is equilibrated to 25° C. in a thermostated waterbath.

The pH meter (from KNICK, Calimatic 766 pH meter with temperature sensor) and the pH electrode (combination electrode from Schott N7680) are calibrated using buffer solutions (pH 7.00 and 9.00) at room temperature. The pH meter is first used to measure the starting pH of the suspension at 25° C., then, according to the result, the pH is adjusted to 6.00 with potassium hydroxide solution (0.1 mol/l) or hydrochloric acid solution (0.1 mol/l). The consumption of KOH or HCl solution in ml to pH 6.00 corresponds to $V_1'$.

Thereafter, 20.0 ml of sodium chloride solution (250.00 g of NaCl p.A made up to 1 l with deionized water) are metered in. 0.1 mol/l KOH is then used to continue the titration up to pH 9.00. The consumption of KOH solution in ml up to pH 9.00 corresponds to $V_2'$.

Subsequently, the volumes $V_1'$ and $V_2'$ are first normalized to the theoretical starting weight of 1 g and multiplied by 5, which gives Vol 1 and the modified Sears number Vol 2 in the units of ml/(5 g).

Determination of the DBP Absorption

The DBP absorption (DBP number), which is a measure of the adsorption capacity of the precipitated silica, is determined based on the standard DIN 53601 as follows: 12.50 g of silica in pulverulent form or having approximately spherical particles and with moisture content 0-10% (if appropriate, the moisture content is adjusted by drying at 105° C. in a drying cabinet) are introduced into the kneader chamber (article number 279061) of the Brabender absorptometer "E" (without damping of the outlet filter of the torque transducer). In the case of granules, the screening fraction from 1 to 3.15 mm (stainless steel screens from Retsch) is used (by gently pressing the granules with a plastic spatula through the screen of pore size 3.15 mm). With constant mixing (peripheral speed of the kneader paddles 125 rpm), dibutylphthalate is added dropwise at room temperature to the mixture at a rate of 4 ml/min by means of the Brabender T 90/50 Dosimat. It is incorporated by mixing with only a small amount of force and is monitored using the digital display. Towards the end of the determination, the mixture becomes pasty, which is indicated by means of a rapid rise in the force required. When the display shows 600 digits (torque of 0.6 Nm), an electrical contact shuts off both the kneader and the DBP metering. The synchronous motor for the DBP feed is coupled to a digital counter, and so the consumption of DBP in. ml can be read off.

The DBP absorption is reported in g/(100 g) and is calculated by the following formula:

$$DBP = \frac{V*D*100}{E} * \frac{g}{100\ g} + K$$

where

DBP=DBP absorption in g/(100 g)

V=consumption of DBP in ml

D=density of DBP in g/ml (1.047 g/ml at 20° C.)

E=starting weight of silica in g

K=correction value according to moisture correction table in g/(100 g)

The DBP absorption is defined for the anhydrous, dried silica. In the case of use of moist precipitated silicas, the correction value K should be taken into account for the calculation of the DBP absorption. This value can be determined with reference to the following correction table; for example, a water content of the silica of 5.8% would mean addition of 33 g/(100 g) for the DBP absorption. The moisture content of the silica is determined by means of the method "determining the moisture content or the drying loss".

TABLE 1

Moisture content correction table for dibutylphthalate absorption (anhydrous)

| % moisture content | % moisture content | | | | |
|---|---|---|---|---|---|
| | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the BET Surface Area

The specific nitrogen surface area (referred to hereinafter as BET surface area) of the silica in pulverulent form, having approximately spherical particles or in granular form is determined based on ISO 5794-1/Annex D with the TRISTAR 3000 instrument (from Micromeritics) by the multipoint determination to DIN-ISO 9277.

Determination of the CTAB Surface Area

The method is based on adsorption of CTAB (N-hexadecyl-N,N,N-trimethylammonium bromide) on the "outer" surface of the silica based on ASTM 3765, or NFT 45-007 (Chapter 5.12.1.3).

CTAB is adsorbed in aqueous solution with stirring and ultrasound treatment. Excess, unadsorbed CTAB is determined by back-titration with NDSS (dioctylsodium sulfosuccinate solution, "Aerosol OT" solution) with a titroprocessor, the end point being given by the maximum of turbidity of the solution and being determined with a phototrode. The temperature during performance of all operations is 23-25° C., in order to prevent the crystallization of CTAB. The back-titration is based on the following reaction equation:

$(C_{20}H_{37}O_4)SO_3Na$ + $BrN(CH_3)_3(C_{16}H_{33})$ $\Longrightarrow$
   NDSS                              $(C_{20}H_{37}O_4)SO_3N(CH_3)_3(C_{16}H_{33})$ + $NaBr$
                                        CTAB Instruments METTLER Toledo DL 55 titroprocessor and METTLER Toledo DL 70 titroprocessor, each equipped with: pH electrode, manufacturer: Mettler, DG 111 and phototrode, manufacturer: Mettler, DP 550
100 ml polypropylene titration cup
Titration glass vessel, 150 ml with lid
Pressure filtration unit, capacity 100 ml
Membrane filter made of cellulose nitrate, pore size 0.1 μm, Ø47 mm, for example Whatman (cat. No. 7181-004)

Reagents

The solutions of CTAB ($C_{CTAB}$=0.015 mol/l in deionized water) and NDSS (concentration=0.00423 mol/l in deionized water) are purchased ready for use (from Bernd Kraft GmbH, 47167 Duisburg: catalogue No. 6056.4700 CTAB solution of concentration 0.015 mol/l; catalogue No. 6057.4700 NDSS solution 0.00423 mol/l, stored at 25° C. and used within one month.

Procedure

1. Blank Titration

The consumption of NDSS solution for titration of 5 ml of CTAB solution should be checked 1× daily before each test series. To this end, the phototrode, before the start of the titration, is adjusted to 1000±20 mV (corresponding to a transparency of 100%).

Exactly 5.00 ml of CTAB solution are pipetted into a titration cup and 50.0 ml of deionized water are added. With stirring, the titration with NDSS solution is effected by the test method familiar to those skilled in the art with the DL 55 titroprocessor up to max. turbidity of the solution. The consumption $V_A$ of NDSS solution is determined in ml. Each titration should be conducted as a triple determination.

2. Adsorption 10.0 g of the silica in pulverulent form, having approximately spherical particles or in granulated form, with a moisture content of 5±2% (if appropriate, the moisture content is adjusted by drying at 105° C. in a drying cabinet or homogeneous moistening), are comminuted with a mill (IKA M 20 mill with M 21 stainless steel beaters) for 60 seconds. Exactly 500.0 mg of the comminuted sample (starting weight E) are transferred to a 150 ml titration vessel with a magnetic stirrer bar and exactly 100.0 ml of CTAB solution ($T_1$) are metered in. The titration vessel is closed with a lid and stirred until wetting is complete with an Ultra Turrax T 25 stirrer (KV-18G stirrer shaft, diameter 18 mm) at 18 000 rpm for not more than 1 min. The titration vessel is screwed onto the DL 70 titroprocessor and the pH of the suspension is adjusted with KOH (0.1 mol/l) to a value of 9±0.05.

There follows a 4-minute ultrasound treatment of the suspension in the titration vessel in an ultrasound bath (from Bandelin, Sonorex RK 106 S, 35 kHz, 100 W effective or 200 W peak power) at 25° C. This is followed by an immediate pressure filtration through a membrane filter at a nitrogen pressure of 1.2 bar. The first runners of 5 ml are discarded.

3. Titration 5.00 ml of the remaining filtrate are pipetted into a 100 ml titration cup and made up to 50.00 ml with deionized water. The titration cup is screwed onto the DL 55 titroprocessor and titration with NDSS solution is effected with stirring up to the maximum turbidity. The consumption $V_B$ of NDSS solution is determined in ml. Each titration should be conducted as a triple determination.

Calculation $$CTAB(\text{not moisture-corrected}) = \frac{V_A - V_B}{V_A} * \frac{C_{CTAB} * M_{CTAB} * T_1 * P}{E}$$

$V_A$=consumption of NDSS solution in ml in the titration of the blank sample
$V_B$=consumption of NDSS solution in ml using the filtrate
$C_{CTAB}$=concentration of the CTAB solution in mol/l
$M_{CTAB}$=molar mass of CTAB=364.46 g/mol
$T_1$=amount of CTAB solution added in l
P=space requirement of CTAB=578.435 m$^2$/g
E=initial weight of silica The CTAB surface area is based on the anhydrous silica, and the following correction is therefore carried out.

$$CTAB = \frac{CTAB(\text{not moisture-corrected}) \text{ in } m^2/g * 100\%}{100\% - \text{moisture content in \%}}$$

The moisture content of the silica is determined by the "determination of the moisture content" method described.

Determination of the Particle Size Distribution

The particle size distribution of silica is determined. The sample to be studied is ground, then dispersed in an aqueous solution and separated according to its particle size in a disc centrifuge: the larger—and hence heavier—the particles are, the more rapidly they move in the gravitational field of the centrifuge. There, they pass through a light barrier; the absorption is measured as a function of time. These data are used to calculate the particle size distribution, i.e. the frequency as a function of the particle diameter.

Instruments Used:

| | |
|---|---|
| Disc centrifuge | CPS Instruments Inc., DC24000 |
| Utrasound finger | Hielscher UP200S with S14 Sonotrode |
| Universal mill beaters | IKA M20 with M21 stainless steel |
| Lauda cooling bath | RM6 with RMS cold thermostat |

Analytical balance
Syringes: 1.0 ml and 2.0 ml
Beaded-edge glass bottles with white snap lids; 30 ml; 75 mm×28 mm; manufacturer: Scherf, item number: 47407, supplier: J. Fleischhacker GmbH & Co. KG, item number: 125623075
Chemicals:
Ethanol p.A., from Merck
Water, deionized
Sucrose, from Acros
Dodecane, from Merck
PVC reference standard; the peak maximum of the reference standard used should be between 500 and 600 nm.

Preparation of the Disc Centrifuge

The running disc centrifuge is filled with a density gradient of sucrose solutions and provided with a dodecane cover layer.

Procedure:

Sugar solutions of different concentration are prepared. The proportions by mass of the sugar solutions are between w=8.0% and w=24.0%. The density gradient is built up in nine stages:
24.0%/22.0%/20.0%/18.0%/16.0%/14.0%/12.0%/10.0%/8.0%

In each case 1.6 ml of the different sugar solutions per density stage are injected into the disc centrifuge, beginning with the highest concentration. Finally, 0.5 ml of dodecane is injected.

Sample Preparation

Before the dispersion, the silica sample is ground. To this end, 15 g (±0.5 g) of sample material is ground in the IKA universal mill for 60 seconds. 0.75 g (±0.05 g) of this ground material is weighed into a 30 ml beaded-edge snap-lid glass bottle and admixed with 15 ml of deionized water. The filled beaded-edge snap-lid glass bottle is fixed with the aid of a clamp in a cooling bath at a controlled temperature of approx. 5° C. The ultrasound finger is positioned such that the sonotrode is immersed 5.5 cm deep (but at least 5 cm) into the bottle—measured from the upper edge of the beaded-edge bottle. The sample is treated with ultrasound at 100% amplitude and 100% pulse (cycle=1) for 15 minutes.

Procedure

Before the start of the measurements, the centrifuge is allowed to warm up at the preset speed (20 000 rpm) for at least 30 min. All measurements likewise run at a peripheral speed of 20 000 rpm. The measurement procedure is retrieved in the instrument software. For the measurements, the following parameters should be established:

Sample Parameters:
  Maximum Diameter: 5.10 microns
  Minimum Diameter: 0.01 microns
  Particle Density: 2.0 g/ml
  Particle Refractive Index: 1.44
  Particle Absorption: 0.001 K
  Non-Sphericity Factor: 1.1
  Calibration Standard Parameters (depending on the calibration standard used):
Example:
  Peak Diameter: 0.585 microns
  Half Height Peak Width: 0.2 microns
  Particle Density: 1.385 g/ml
Fluid Parameters:
  Fluid Density: 1.045 g/ml
  Fluid Refractive Index: 1.344
  Fluid Viscosity: 1.2 cps In the "system configuration" submenu, the measurement wavelength is set to 470 nm.

In the "runtime options" submenu, the following parameters are established:
Force Baseline: Yes
Correct for Non-Stokes: No
Extra Software Noise Filtration: No Extra Filter
Baseline Drift Display: Do Not Show
Calibration method: External
Samples per calibration: 1

To measure the sample dispersion, the "operate analyzer" submenu is selected. The steps required for the analysis are prompted successively in the "instructions" line. Before each analysis, a calibration standard should be recorded. In each case 0.1 ml of the standard or of the sample dispersion is injected. A double determination of each sample to be analyzed (including dispersion by means of ultrasound) is carried out. The analyses on the silica dispersions to be analyzed are terminated manually at the point at which the absorption, after the recording of the peak to be analyzed, which should generally be between 30 nm and 250 nm, reaches the starting value again, generally 0.

Result

The weight distribution is determined from the raw data curve (corrected by the light scatter) by the instrument software (CPS Disc Centrifuge Operating Software; Version 9.5b; Released February 2006). The results are determined in each case from the averaged values from the double determination.

The following are reported:

Peak (Mode), unit µm, most common particle size, corresponds to the abscissa value of the maximum of the distribution function. This value is calculated by the instrument software.

(Half Width), unit µm, corresponds to the width of the distribution function at 50% of its maximum value. This value is calculated by the instrument software.

Oversize Percentiles, unit µm, corresponds to the proportion specified (1%, 5%, 10%, 25%, 50%, 75%, 90%, 95%, 99%) of the particles which are larger than the reported particle diameter of the weight distribution. These values are calculated by the instrument software.

25%/75% quartile ratio, no unit, a further measure of the width of the distribution, formed from the ratio of the particle sizes at 25% and 75%, can be read off from the oversize percentiles parameters. This value must be calculated manually.

Half Width/Peak, no unit, the quotient of the half-height width data and of the peak must be calculated manually.

Determination of the Particle Size by Means of Laser Diffraction

The use of laser diffraction to determine particle sizes of powders is based on the phenomenon that particles scatter monochromatic light in all directions with a different intensity pattern. This scatter depends on the particle size. The smaller the particle sizes, the greater the angles of scatter are. The sample preparation and analysis (flushing of the module, etc.) are effected, in the case of hydrophilic precipitated silica, with demineralized water, and in the case of insufficiently water-wettable precipitated silica with pure ethanol.

Before the start of the analysis, the LS 230 laser diffraction instrument (from Coulter) and liquid module (Small Volume Module Plus, 120 ml, from Coulter) is allowed to warm up for 2 h, the module is flushed three times with demineralized water and calibrated and, in the case of hydrophobic precipitated silicas, flushed three times with ethanol.

In the control bar of the instrument software, the "analysis" menu item is used to select the file window "calculate Opt. Model", and the refractive indices are recorded in an .rfd file: liquid refractive index B. I. Real=1.332 (1.359 for ethanol); material refractive index Real=1.46; Imaginary=0.1; form factor 1. In addition, in this file window, the following points are selected: offset analysis, adjustment, background measurement, adjust analysis concentration, input sample info, input analysis info, analysis time 60 s, number of measurements 1, no PIDS data, size distribution. The pump speed is set to 30% on the instrument.

The homogeneous suspension of 1 g of silica in 40 ml of demineralized water is added with a 2 ml disposable pipette to the liquid module of the instrument in such a way that a constant concentration with a light absorption of 8 to 12% is achieved and the instrument shows "OK". The analysis is effected at room temperature. The raw data curve is used by the software to calculate; on the basis of the volume distribution, taking account of Mie theory and the optical model parameters (.rfd file), the particle size distribution and the d50 value (median).

Determination of the Sieve Residue (Alpine)

This sieve residue determination is an air jet sieving based on DIN ISO 8130-1 by means of an Alpine S 200 air-jet sieving system. To determine the $d_{50}$ values of microgranules and granules, sieves with a mesh size of >300 μm are also used for this purpose. In order to determine the $d_{50}$, the sieves must be selected such that they afford a particle size distribution from which the $d_{50}$ value can be determined according to FIG. 2. The graphic representation and evaluation are analogous to ISO 2591-1, Chapter 8.2.

The $d_{50}$ value is understood to mean the particle diameter in the cumulative particle size distribution at which 50% of the particles have a smaller or equal particle diameter than/to the particles with the particle diameter of the $d_{50}$ value.

Determination of the Sieve Residue (Ro-Tap)

This method is used to determine the proportion of relatively coarse particles (>300 μm) and the proportion of relatively fine particles (<75 μm) of granules by means of sieving.

A sieving pan, an analysis sieve with metal wire gauze (DIN ISO 565 T.2, nominal mesh size 75 μm), an analysis sieve with metal wire gauze (DIN ISO 565 T.2, nominal mesh size 150 μm), and an analysis sieve with metal wire gauze (DIN ISO 565 T.2, nominal mesh size 300 μm) with screen diameter in each case 200 mm, are used. The sieving tower is introduced in the sequence specified in to a Ro-Tap B 8260 analytical sieving machine with time switch from Tyler, and a homogeneous amount of sample of 100.00 g of the silica granules is transferred to the uppermost sieve. The sieve lid and the tapper are attached and the sieving is effected with a circular and tapping motion for 5 min.

The sieve residues (Ro-Tap) are determined according to sieve fraction (Ro-Tap,<75 μm) in %=$(A_S/E)$*100%, and sieve residue (Ro-Tap,>300 μm) in %=$(A_{300}/E)$*100%, where
$A_S$=final weight of the residue in the sieving pan in g,
$A_{300}$=final weight of the residue on the sieve of nominal mesh size 300 μm in g
and E=starting weight in g.

Determination of the Aluminum Oxide Content

The aluminum oxide content is determined on the basis of DIN EN ISO 3262-18 by means of flame atomic adsorption spectrometry at a wavelength of 309.3 nm.

Approx. 20 g of silica are weighed accurately to 0.01 g into a platinum crucible and moistened with distilled water. 1 ml of conc. hydrofluoric acid (40%, p.a.) is added and the mixture is heated in a sandbath until it fumes. Nitric acid is gradually added dropwise until the silica has dissolved completely. After concentrating to dryness, the residue is dissolved in 3 ml of conc. hydrochloric acid. The cooled solution is transferred quantitatively into a 100 ml standard flask and made up to 100 ml there with distilled water.

The solution thus prepared is analyzed according to the operating instructions in a flame atomic adsorption spectrometer (wavelength: 309.3 nm, Slit S: 0.7 nm, gas stream: acetylene/$N_2O$).

The aluminum oxide content is determined on the original sample, but the content is based on the sample calcined at 1000° C. for 2 h.

$$\% \ Al_2O_3 \ _{based \ on \ calcined \ substance} = \frac{\% \ Al_2O_3 \ _{based \ on \ original \ substance} \times 100}{100\% - \text{ignition loss in } \%}.$$

Determination of the Pore Size Distribution
Pretreatment of the Silicas Before Mercury Porosimetry Before the analysis, the silica is subjected to a pressure treatment. For this purpose, a manual hydraulic press is used (catalogue No. 15011 from Specac Ltd., River House, 97 Cray Avenue, Orpington, Kent BR5 4HE, U.K.). 250 mg of silica are weighed into a pellet die of internal diameter 13 mm from Specac, Ltd. and, according to the display, loaded with 1 t. This load is maintained for 5 s and, if appropriate, readjusted. The readjustment is effected in such a way that, in the event of a pressure decline, recognizable by the load display falling below 1 t, the pressure during the five-second pressing phase has to be built up again by the operator, and pressing is thus effected at very substantially permanently constant load. The readjustment must be effected as soon as the pressure display falls below 1 t. Subsequently, the sample is decompressed and dried in a forced-air drying cabinet at 105±2° C. for 4 h.

Procedure of the Mercury Porosimetry Analysis

The method is based on Hg intrusion to DIN 66133, using an Autopore IV 9500 instrument from Micromeritics. The silica is weighed accurately to 0.001 g into the type 10 penetrometer (article number of the penetrometer from Micrometrics is 950-61710-00). Subsequently, the penetrometer is evacuated slowly to 50 mm Hg column and left at this pressure for 5 min. The Autopore instrument is operated according to the operating instructions with Software Version IV 1.05. Each measurement is corrected by a blank measurement of the penetrometer. The measurement range is 0.0025-420 MPa, using at least 136 equilibrium measurement points (instrument-specific criterion of 10 s) (in the 0.0025-0.25 MPa range: 30 points, in the 0.25-15 MPa range: 53 points, 15-150 MPa: 40 points, in the 150-420 MPa range: 13 points). If appropriate, the software inserts further measurement points when the incremental intrusion volume is >0.04 ml/g. An intrusion curve is obtained, the intrusion curve representing the depiction of a function V(d), the value of which for each diameter (d) is the specific amount of mercury (V) introduced up to this diameter. The intrusion curve is smoothed by means of the "smooth differentials" function of the instrument software.

Determination of the Fineness Value F.V. (with Pressure Pre-Treatment), Unit Å

The fineness value F.V. represents the mean radius of the intraaggregate pores, i.e. the radius of the pores to which the pore surface area $S_0/2$, measured by mercury porosimetry specified above corresponds ($S_0$ is the surface area which is contributed by all pores whose diameter is greater than or equal to 100 Å). For the calculation of the fineness value F.V. (pressed), the procedure is as follows. A curve A(r) of the pore surface distribution, calculated as described in DIN 66133 (in force since 1993), over the pore radius r, which is determined from the WASHBURN equation, is established. For the calculations, a contact angle of 140° and a surface tension of 484 mN/m are assumed.

Figure 3:
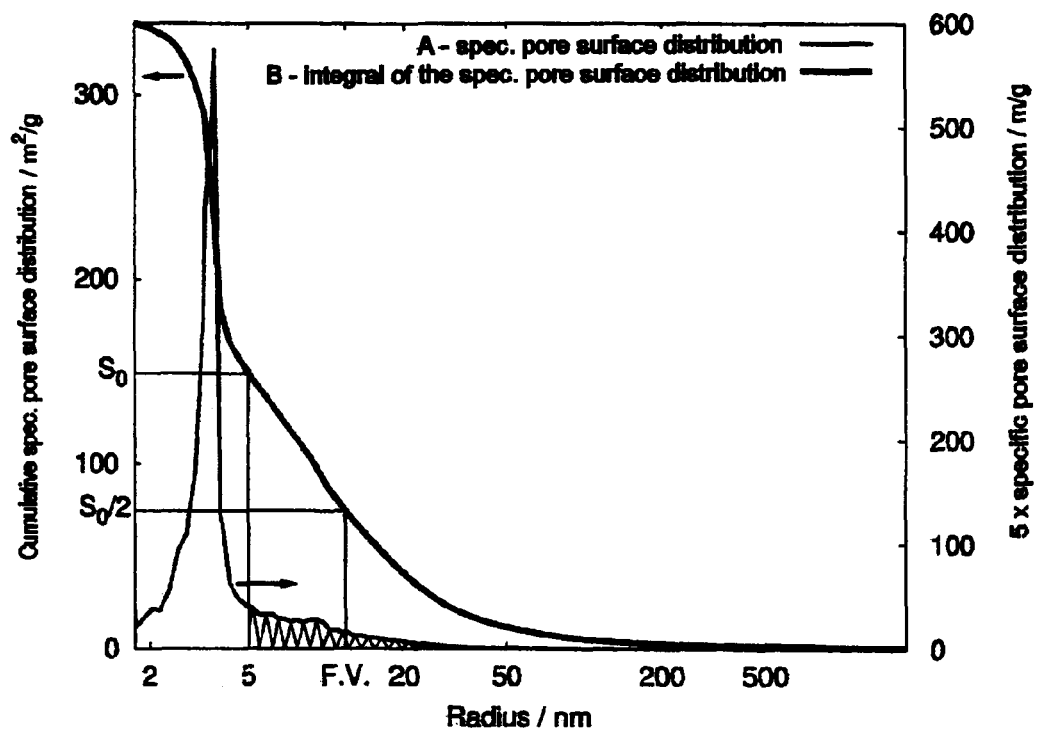

B(r) is the integral of the pore surface distribution from r to ∞. ∞ in this context means that the initial pressure for the mercury porosimetry measurement is at absolute pressure 4.2 kPa. FIG. 3 is a graphic representation of the connections described above.

Equations 1-3 apply.

$$B(r) = \int_r^\infty A(R) dR \quad (1)$$

$$S_0 = B(5 \text{ nm}) \quad (2)$$

$$\frac{S_0}{2} = B(F.V.) \quad (3)$$

The relationship between A(r) and B(r) is given by Eq.1 and shown graphically in FIG. 3 for r=5 nm. The shaded area under the A(r) curve corresponds to the value of $s_0$=B(r) at r=5 nm (diameter of 100 Å). The arrows indicate that the values for the curve A(r) or B(r) closest to the arrow can be read off from the axis at which the arrow points.

$S_0$ is the integral of the pore surface distribution over the radius r for pores with diameter greater than or equal to 100 Å (10 nm) (equation 2).

The fineness value F.V. (pressed) is then the greatest radius at which the integral of the pore surface distribution over the radius assumes the value $S_0/2$ (equation 3).

Determination of the Pore Volume Ratio V2/V1 (with Pressure Pretreatment
Pore Volume Ratio V2/V1, No Unit For the calculation, a contact angle of 130° and a surface tension of 484 mN/m are assumed. The pore volume V1 is determined from the cumulated pore volume in the pore diameter range of 5.5-40 nm. The pore volume V2 is determined from the cumulated pore volume in the pore diameter range of 17.5-27.5 nm. The proportion of the pores in the V2 range is determined from the quotient V2/V1.

Figure 2:
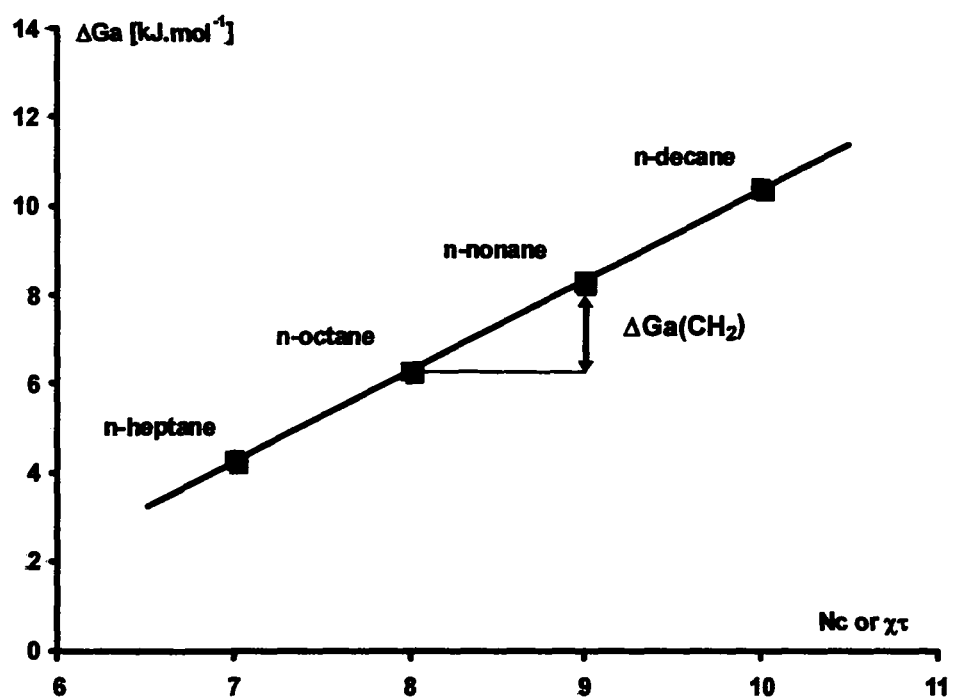

Determination of the Relative Width γ of the Pore Size Distribution (with Pressure Pretreatment)
Relative Width γ, Unit (gnm)/ml For the calculation, a contact angle of 140° and a surface tension of 480 mN/m are assumed. In order to determine the relative width γ of the pore size distribution, the following algorithm is applied to the data of the negative logarithmic derivative of the intrusion curve in the pore diameter range of 3.5 nm to 5 μm: the algorithm uses a moveable window which originates from large pore diameters and is composed of three successive measurement points of the negative logarithmic derivative of the intrusion curve, and places a parabola through the points. The maximum of the parabola is defined as the sought-after maximum A at a pore diameter a. It is checked whether the point a is within the sought-after pore diameter range and is the global maximum of the negative logarithmic derivative of the intrusion curve. If this is not the case, the window is shifted by one point, another parabola is placed, and the operation is repeated until both criteria are met. Then, B is defined as 0.300 A. Let b be the pore diameter of the curve which is smaller than a at which the value B is attained for the first time. Finally, the relative width γ of the pore size distribution is defined as γ=(a−b)/(A−B)=(a−b)/(0.7 A), where a and b are in nanometers and γ has the unit (gnm)/ml. A typical curve profile of the negative logarithmic derivative of the cumulated pore volume V according to equation 1 with regard to the pore diameter x with i measurement points and the features a, b, A and B is shown in FIG. 2.

Equation 1:

$$\frac{dV}{d\log x} = \frac{dV}{\frac{1}{2}dx} = x\frac{dV}{dx}$$

$$x\frac{dV}{dx} \approx x\frac{\Delta V}{\Delta x}\bigg|_{\Delta x = x_i - x_{i-1}} = x_i\frac{V_i - V_{i-1}}{x_i - x_{i-1}} \approx x_i\frac{V_{i+1} - V_{i-1}}{x_{i+1} - x_{i-1}}$$

Determination of the Morphology Index

The analyses were carried out using a FISONS HRGC Mega 2 instrument equipped with a flame ionization detector (FID). The silica was pressed with an ICL (International Crystal Laboratories) hydraulic laboratory press at a load of 2 tonnes for 2 minutes, in order to obtain a single round pellet of diameter 13 mm and height 5 mm.

This pellet is then crushed manually with a pestle in an Achat mortar for 30 seconds (capacity 30 ml, internal diameter 65 mm). The crushed material is then sieved manually through two stainless steel sieves with a diameter of 100 mm and a height of 45 mm from Bioblock Scientific. The meshes of the sieves are 0.425 mm (Mesh 40) and 0.106 mm (Mesh 140). The sieves are arranged in the sequence of decreasing mesh size. Below the last sieve there is a collecting dish.

This procedure is repeated with several pellets until sufficient material is available to fill the column. The material which remains on the sieve of mesh size 0.106 mm (sieve fraction of 0.425 to 0.106 mm) is used to fill the column.

The chromatographic column is prepared as follows: a stainless steel tube of diameter ⅛" is cut to the required length. The length of the column depends on the specific surface area of the solid to be analysed. The rule here is that the amount of solid in the column must have a surface area of 20 to 40 m². The manufacturer of this tube is Interchrom.

The powder prepared (see the above description) is introduced homogeneously into the chromatographic column through a conical funnel. It must be ensured that no cavities form in the bed. The flame ionization detector is operated at 150° C., the injector heated to 120° C. Before the analysis, the column is baked out by baking it out at 160° C. at a helium flow of 15 ml/min for 15 hours. The determination of the straight lines of the n-alkanes and of the surface nanoroughness is carried out at 110° C. under a helium flow rate of 20 ml/min. For the flame ionization detector, the most sensitive setting of the detector is selected.

The linear alkanes which were used for the determination of the straight lines are n-heptane, n-octane, n-nonane and n-decane (see FIG. 2). At least 3 injections are undertaken for each solution, the net retention times are determined and the values are averaged.

The net retention time of each solution is calculated from the difference of gross retention time and dead time. The dead time is based on the gross retention time of methane. The gross retention times correspond to the retention time of the centre of the chromatographic peak (not of the peak apex).

It is important here that the net retention times are independent of the amount injected (this is the proof that analysis is effected under the conditions of infinite dilution).

The branched and cyclic alkane samples for the determination of nanoroughness are 2,2,4-trimethylpentane, 2,2-dimethylhexane and cyclooctane. The morphology index (IM) is calculated from the ratio of the retention volume of the particular branched or cyclic alkane $V_G(M)$ and of the retention volume of an n-alkane $V_G(C)$, which has the same accessibility to the silica surface:

$$IM = V_G(M)/V_G(C)$$

In this way, one IM each is determined for 2,2,4-trimethylpentane, 2,2-dimethylhexane and cyclooctane. The IM specified in the claims and the description corresponds to the mean of the three morphology indices determined beforehand for 2,2,4-trimethylpentane, 2,2-dimethylhexane and cyclooctane.

All solutions injected are of chromatographic quality. The following products were used:
n-heptane, for HPLC, ≥99.5% (GC), FLUKA
n-octane, puriss. p.a., Standard for GC, ≥99.8% (GC), FLUKA
n-nonane, puriss. p.a., Standard for GC, ≥99.8% (GC), FLUKA n-decane, puriss. purum, ≥98.0% (GC), FLUKA
cyclooctane, purum, ≥99.0% (GC), FLUKA
2,2,4-trimethylpentane, for HPLC, ≥99.5% (GC), FLUKA
2,2-dimethylhexane, purum, ~98.0% (GC), FLUKA The examples which follow are intended to illustrate the invention in detail, without restricting its scope.

EXAMPLE 1

A stainless steel jacketed reactor (height 1.60 m, internal diameter 1.60 m) with angled base and MIG angled-blade stirrer system is initially charged with 1552 l of water and 141.3 kg of waterglass (density 1.348 kg/l, 27.0% by weight of $SiO_2$, 8.05% by weight of $Na_2O$). Subsequently, with stirring at a temperature of 83° C. for 80 min, 5.53 kg/min of the abovementioned waterglass and approx. 0.65 kg/min of sulphuric acid (density 1.83 kg/l, 96% by weight of $H_2SO_4$) are metered in simultaneously. The metered addition of sulphuric acid is regulated such that an AN of 20.0+/−0.2 exists within the reaction medium over the entire duration of metered addition. The addition of waterglass is stopped and the sulphuric acid is supplied further at 0.60 kg/min until a pH of 9.0 (measured at room temperature) is attained. Directly thereafter, the suspension is heated to 90° C. and stirred at this temperature for 60 min. The addition of sulphuric acid of 0.60 kg/min is resumed until a pH of 7.0 (measured at room temperature) is attained. An addition of sulphuric acid of 0.3 kg/min is used to establish the end pH of the suspension of 4.0 (measured at room temperature).

The resulting suspension is filtered with a membrane filter press and the filtercake is washed with water. The filtercake with solids content 22.5% by weight is subsequently spin-flash-dried. The roller granulation is effected with a WP 50N/75 roller press from Alexanderwerk AG. The pulverulent product, without further addition of binders or liquids, via a horizontal feed system with a single screw (speed 120 rpm), is vented by means of a vacuum system (reduced pressure 0.65 bar) and introduced homogeneously between the vertical rollers mounted at both sides. At a speed of 13 rpm and a pressure of 9 bar, the powder is pressed to a slug and comminuted by means of a crusher (mesh size 8 mm). The fines (approx. 20% by weight) are removed with a zigzag sifter and recycled into the powder introduction.

The physicochemical data of a representative sample of the granule (example 1) are listed in table 2.

EXAMPLE 2

A stainless steel jacketed reactor (height 1.60 m, internal diameter 1.60 m) with angled base MIG and angled-blade stirrer system is initially charged with 1552 l of water and 141.3 kg of waterglass (density 1.348 kg/l, 27.0% by weight of $SiO_2$, 8.05% by weight of $Na_2O$). Subsequently, with stirring and additional shearing by means of an Ekato fluid shearing turbine, at a temperature of 83° C. for 80 min, 5.53 kg/min of the abovementioned waterglass and approx. 0.65 kg/min of sulphuric acid (density 1.83 kg/l, 96% by weight of $H_2SO_4$) are metered in simultaneously. The metered addition of sulphuric acid is effected onto the turbine disc and is regulated such that an AN of 20.0+/−0.2 exists within the reaction medium over the entire duration of metered addition. The addition of waterglass is stopped and the sulphuric acid is supplied further at 0.60 kg/min until a pH of 9.0 (measured at room temperature) is attained. Directly thereafter, the suspension is heated to 90° C. and stirred at this temperature for 60 min. The turbine is switched off and the addition of sulphuric acid of 0.60 kg/min is resumed until a pH of 7.0 (measured at room temperature) is attained. An addition of sulphuric acid of 0.3 kg/min is used to establish the end pH of the suspension of 4.0 (measured at room temperature).

The resulting suspension is filtered with a membrane filter press and the filtercake is washed with water. The filtercake with solids content 22.5% by weight is subsequently spin-flash-dried. The roller granulation is effected with a WP 50N/75 roller press from Alexanderwerk AG. The pulverulent product, without further addition of binders or liquids, via a horizontal feed system with a single screw (speed 120 rpm), is vented by means of a vacuum system (reduced pressure 0.65 bar) and introduced homogeneously between the vertical rollers mounted at both sides. At a speed of 13 rpm and a pressure of 9 bar, the powder is pressed to a slug and comminuted by means of a crusher (mesh size 8 mm). The fines (approx. 20% by weight) are removed with a zigzag sifter and recycled into the powder introduction.

The physicochemical data of a representative sample of the powder (example 2b) and of the granule (example 2a) are listed in table 2.

EXAMPLE 3

A stainless steel jacketed reactor (height 1.60 m, internal diameter 1.60 m) with angled base and MIG angled-blade stirrer system is initially charged with 1552 l of water and 141.3 kg of waterglass (density 1.348 kg/l, 27.0% by weight of $SiO_2$, 8.05% by weight of $Na_2O$). Subsequently, with stirring at a temperature of 84° C. for 80 min, 5.53 kg/min of the abovementioned waterglass and approx. 0.65 kg/min of sulphuric acid (density 1.83 kg/l, 96% by weight of $H_2SO_4$) are metered in simultaneously. The metered addition of sulphuric acid is regulated such that an AN of 20.0+/−0.2 exists within the reaction medium over the entire duration of metered addition. The addition of waterglass is stopped and the sulphuric acid is supplied further at 0.60 kg/min until a pH of 9.0 (measured at room temperature) is attained. Directly thereafter, the suspension is heated to 90° C. and stirred at this temperature for 60 min. The addition of sulphuric acid of 0.60 kg/min is resumed until a pH of 7.0 (measured at room temperature) is attained. An addition of sulphuric acid of 0.3 kg/min is used to establish the end pH of the suspension of 3.0 (measured at room temperature).

The resulting suspension is filtered with a membrane filter press and the filtercake is washed with water. The filtercake with solids content 24.5% by weight is subsequently spin-flash-dried. The roller granulation is effected with a WP 50N/75 roller press from Alexanderwerk AG. The pulverulent product, without further addition of binders or liquids, via a horizontal feed system with a single screw (speed 120 rpm), is vented by means of a vacuum system (reduced pressure 0.67 bar) and introduced homogeneously between the vertical rollers mounted at both sides. At a speed of 13 rpm and a pressure of 12 bar, the powder is pressed to a slug and comminuted by means of a crusher (mesh size 8 mm). The fines (approx. 20% by weight) are removed with a zigzag sifter and recycled into the powder introduction.

The physicochemical data of a representative sample of the granule (example 3) are listed in table 2.

EXAMPLE 4

A stainless steel jacketed reactor (height 1.60 m, internal diameter 1.60 m) with angled base and MIG angled-blade stirrer system is initially charged with 1540 l of water and 141.0 kg of waterglass (density 1.348 kg/l, 27.0% by weight of $SiO_2$, 8.05% by weight of $Na_2O$). Subsequently, with stirring at a temperature of 85.5° C. for 80 min, 5.53 kg/min of the abovementioned waterglass and approx. 0.65 kg/min of sulphuric acid (density 1.83 kg/l, 96% by weight of $H_2SO_4$) are metered in simultaneously. The metered addition of sulphuric acid is regulated such that an AN of 20.0+/−0.2 exists within the reaction medium over the entire duration of metered addition. The addition of waterglass is stopped and the sulphuric acid is supplied further at 0.65 kg/min until a pH of 7.0 (measured at room temperature) is attained. Thereafter, metered addition is continued with a reduced metering rate of 0.3 kg/min down to a pH of 3.8 (measured at room temperature).

The resulting suspension is filtered with a membrane filter press and the filtercake is washed with water. The filtercake with solids content 16-19% by weight is subsequently liquefied with water, sulphuric acid and sodium aluminate in a shearing unit. The addition of sodium aluminate is controlled such that an $Al_2O_3$ concentration of 0.5% based on the end product is achieved. However, an $Al_2O_3$ concentration of 0.65% was achieved as a result of Al fractions in the waterglass. The silica feed with solids content 15-16% and a pH of 6.0 is then spray-dried. The roller granulation is effected with a WP 50N/75 roller press from Alexanderwerk AG. The pulverulent product, without further addition of binders or liquids, via a horizontal feed system with a single screw (speed 120 rpm), is vented by means of a vacuum system (reduced pressure 0.65 bar) and introduced homogeneously between the vertical rollers mounted at both sides. At a speed of 13 rpm and a pressure of 9 bar, the powder is pressed to a granule (slug) and comminuted by means of a crusher (mesh size 8 mm). The fines (approx. 20% by weight) are removed with a zigzag sifter and recycled into the powder introduction.

The physicochemical data of a representative sample of the granule (example 4) are listed in table 2.

The physical data of the above silicas are compiled in table 2 which follows. The reference values shown are the data of the two precipitated silicas Ultrasil 7000 GR (Evonik Degussa GmbH; reference 1) and Zeosil 1165 MP (Rhodia Deutschland GmbH; reference 2).

TABLE 2

Physicochemical data of the inventive silicas and of the comparative silicas

|  |  | Reference 1 | Reference 2 | Example 1 | Example 2a | Example 2b | Example 3 | Example 4 |
|---|---|---|---|---|---|---|---|---|
| BET | m²/g | 173 | 152 | 185 | 185 | 183 | 170 | 172 |
| CTAB | m²/g | 157 | 159 | 177 | 174 | 176 | 162 | 152 |
| DBP | g/(100 g) | 235 | 240 | 221 | 216 | 261 | 222 | 224 |
| Modified Sears number, Vol 2 | ml/(5 g) | 15.9 | 20.2 | 25.8 | 25.2 | 25.1 | 26.3 | 24.7 |
| CPS disc centrifuge |  |  |  |  |  |  |  |  |
| half width/peak |  | 1.07 | 0.91 | 0.82 | 0.79 | 0.84 | 0.78 | 0.81 |
| d 25%/d 75% ratio |  | 1.86 | 1.70 | 1.63 | 1.58 | 1.63 | 1.57 | 1.59 |
| Hg porosimetry with pressure pretreatment |  |  |  |  |  |  |  |  |
| Relative width γ (pressed) | nm g/ml | 3.20 | 3.09 | 2.06 | 1.89 | 1.89 | 2.27 | 1.95 |
| V2/V1 (pressed) |  | 0.65 | 0.68 | 0.46 | 0.36 | 0.39 | 0.71 | 0.66 |
| Fineness value F.V. (pressed) | Å | 123 | 129 | 105 | 101 | 102 | 128 | 121 |
| Hg porosimetry without pressure pretreatment |  |  |  |  |  |  |  |  |
| Relative width γ | nm g/ml | 3.61 | 4.60 | 2.43 | 1.93 | 2.39 | 2.07 | 2.06 |
| V2/V1 |  | 0.57 | 0.55 | 0.61 | 0.64 | 0.65 | 0.72 | 0.69 |
| Fineness value F.V. | Å | 145 | 148 | 119 | 119 | 130 | 137 | 134 |
| Morphology index IM (mean) |  | 0.85 | 0.86 | 0.66 | 0.63 | 0.62 | 0.69 | 0.72 |

EXAMPLE 5

Performance Testing

For the production of the rubber mixtures and vulcanizates, Examples 1, 2a, 3 and 4 are used.

General Procedure:

The formulation used for the rubber mixtures (green tyre compound) is specified in the following table 3. In this table, the unit [phr] means parts by weight based on 100 parts of the unvulcanized rubber used.

(oil) and has a Mooney viscosity (ML 1+4/100° C.) of about 47. The polymer Buna CB 24 is a cis-1,4-polybutadiene, (titanium type) from Lanxess Deutschland GmbH with a Mooney viscosity (ML 1+4/100° C.) between 44 and 50. TESPD (bis(triethoxysilylpropyl) disulphide) is sold under the trade name Si 266 by Evonik Degussa GmbH. The plasticizer used was Vivatec 500 (TDAE; oil). Vulkanox 4020 is 6PPD from Rhein Chemie and Protektor G 3108 is an ozone protection wax from Paramelt B.V. Vulkacit D (DPG) and Vulkacit CZ (CBS) are commercial products from Rhein

TABLE 3

Formulation of a green tyre mixture

| Substance | phr | Article designation | Company |
|---|---|---|---|
| 1st stage Base mixing | | | |
| Buna VSL 5025-2 | 75.7 | S-SBR; oil-extended (see text) | Lanxess Deutschland GmbH; 51369 Leverkusen; Germany |
| SMR 10 (ML 1 + 4 = 60 to 70) | 15.0 | degraded natural rubber | Wurfbain Nordmann GmbH; 20459 Hamburg; Germany |
| Buna CB 24 | 30.0 | cis-1,4 BR (see text) | Lanxess Deutschland GmbH; 51369 Leverkusen; Germany |
| Silica | 80.0 | | |
| Si 266 | 5.8 | Bis(3-triethoxysilylpropyl) disulphide | Evonik Degussa GmbH; Frankfurt am Main; Germany |
| ZnO; RS RAL 844 C | 2.5 | zinc oxide | Amsperger Chemikalien GmbH; 50858 Cologne; Germany |
| EDENOR ST1 GS | 2.0 | Palmitic-stearic acid; "Iodine number 1" stearine | Caldic Deutschland GmbH & Co. KG; 40231 Düsseldorf; Germany |
| Vivatec 500 | 12.3 | TDAE plasticizer oil | Hansen und Rosenthal, 20457 Hamburg, Germany |
| Vulkanox 4020/LG | 1.5 | N-(1,3-dimethylbutyl)-N'-phenyl-p-phenylenediamine (6PPD) | Rhein Chemie Rheinau GmbH; 68219 Mannheim Rheinau; Germany |
| Protektor G 3108 | 1.0 | Mixture of refined hydrocarbon waxes | Paramelt BV; 706875 Paramelt BV; NL 1704 RJ Heerhugowaard; The Netherlands |
| 2nd stage Pinch/remill stage | | | |
| Stage 1 batch | | | |
| 3rd stage Final mixing | | | |
| Stage 2 batch | | | |
| Vulkacit D | 2.0 | N,N'-diphenylguanidine (DPG) | Rhein Chemie Rheinau GmbH; 68219 Mannheim Rheinau; Germany |
| Vulkacit CZ/EG-C | 1.5 | N-cyclohexyl-2-benzothiazolesulpheneamide (CBS) | Rhein Chemie Rheinau GmbH; 68219 Mannheim Rheinau; Germany |
| Perkacit TBZTD | 0.2 | Tetrabenzylthiuram disulphide (TBzTD) | Flexsys N.V./S.A., Woluwe Garden; B-1932 St. Stevens Woluwe; Belgium |
| Ground sulphur | 1.5 | Finely divided sulphur Ph Eur, BP | Merck KGaA; 64271 Darmstadt; Germany |

The polymer VSL 5025-2 is an SBR copolymer polymerized in solution from Lanxess Deutschland GmbH with a styrene content of 25% by weight and a butadiene content of 75% by weight. The copolymer contains 37.5 phr of TDAE Chemie. Perkacit TBzTD is a commercial product from Flexsys B.V.

The rubber mixture is prepared in three stages in an internal mixer according to the following tabular summary (table 4):

TABLE 4

| 1st stage | GK 1.5N internal mixer, fill level 0.74 |
|---|---|
| | 70 rpm, flow temperature 70° C. |
| | Friction 1:1.11 |
| | Ram pressure 5.5 bar |
| 0.0'-0.5' | Polymers |
| 0.5'-1.5' | ½ silica, silane, ZnO, stearic acid, oil |
| 1.5' | Purge |
| 1.5'-3.5' | ½ silica, Vulkanox 4020, protector |
| 3.5' | Purge |
| 3.5'-5.0' | Mix; speed variation may be required in order to |
| 5.0' | achieve the discharge temperature and transfer to roll system. |
| | Peel away milled sheet |
| | Discharge batch (batch temperature 145°-155° C.) |
| Intermediate storage at room temperature for 24 h for stage 2 | |
| 2nd stage | GK 1.5N internal mixer, fill level 0.71 |
| | 80 rpm, flow temperature 80° C. |

TABLE 4-continued

|  |  |
|---|---|
|  | Friction 1:1.11 |
|  | Ram pressure 5.5 bar |
| 0.0'-2.0' | Plasticize stage 1 batch |
| 2.0'-5.0' | Maintain batch temperature 150° C. by speed variation |
| 5.0' | Discharge batch (batch temperature 145° C.-155° C.) and transfer to roll system: Peel away milled sheet |
| Intermediate storage at room temperature for 4 h for stage 3 | |
| 3rd stage | GK 1.5N internal mixer, fill level 0.68 |
|  | 40 rpm, flow temperature 50° C. |
|  | Friction 1:1.11 |
|  | Ram pressure 5.5 bar |
| 0.0'-0.5' | Stage 2 batch |
| 0.5'-2.0' | Constituents of the 3rd stage |
| 2.0' | Discharge batch (batch temperature 90° C.-110° C.) and transfer to a laboratory roll system: Cut and displace the material 3 * left, 3 * right fold material over 2 * at roll nip of 3 mm Peel away milled sheet in the thickness needed for specimen production |
| Intermediate storage at room temperature for 12 h until vulcanization of the specimens | |

The general method for producing rubber mixtures and vulcanizates thereof is described in the following book: "Rubber Technology Handbook", W. Hofmann, Hanser Verlag 1994.

The vulcanization time for the specimens at 160° C. is in each case 18 min. The vulcanizate testing is effected by the test methods specified in table 5.

TABLE 5

| Physical tests | |
|---|---|
| Physical test | Standard/conditions |
| Vulcameter test, 160° C., 0.5° | DIN 53529/3, ISO 6502 |
| MDR rheometer | |
| $M_L$ (dNm) | |
| $M_H$ (dNm) | |
| Delta Torque (dNm) | |
| t 80% – t 20% (min) | |

TABLE 5-continued

| Physical tests | |
|---|---|
| Physical test | Standard/conditions |
| Tensile strength (MPa) | |
| Modulus 300% (MPa) | |
| Elongation at break (%) | |
| Shore A hardness, 23° C. (SH) | DIN 53 505 |
| Ball Rebound 23° C. (%) | DIN EN ISO 8307, Fall height 500 mm, Steel ball, d = 19 mm, 28 g |
| DIN abrasion, 23° C., force 10 N (mm$^3$) | DIN 53 516 |
| Viscoelastic properties, Initial force 50 N and amplitude force 25 N, Heat treatment time 5 min, measurement recorded after test time 30 s Complex modulus E* (MPa) | DIN 53 513, ISO 2856 |

Table 6 which follows shows the performance data of Examples 1, 2a, 3 and 4, which have been compounded and tested according to tables 3-5. The references used were the two precipitated silicas Ultrasil 7000 GR (Evonik Degussa GmbH; reference 1) and Zeosil 1165 MP (Rhodia Deutschland GmbH; reference 2).

TABLE 6

| Performance data | | | | | | | |
|---|---|---|---|---|---|---|---|
| MDR: 160° C.; 0.5° | | Reference 1 | Reference 2 | Example 1 | Example 2a | Example 3 | Example 4 |
| $M_L$ | dNm | 2.6 | 2.3 | 2.8 | 2.8 | 2.4 | 2.2 |
| $M_H$ | dNm | 18.4 | 18.8 | 20.8 | 20.5 | 19.2 | 19.0 |
| Delta torque | dNm | 15.8 | 16.5 | 18.0 | 17.7 | 16.8 | 16.8 |
| t 80%-t 20% | min | 2.9 | 2.3 | 3.0 | 2.7 | 2.5 | 2.3 |
| Vulcanization time (160° C.) | min | 18 | 18 | 18 | 18 | 18 | 18 |
| Tensile strength (dumb-bell 1) | MPa | 15.2 | 16.3 | 15.3 | 17.5 | 18.5 | 16.9 |
| Modulus 300% | MPa | 7.4 | 7.9 | 7.4 | 7.4 | 7.7 | 7.9 |
| Elongation at break | % | 494 | 482 | 481 | 513 | 546 | 492 |
| Shore A hardness | SH | 61 | 64 | 66 | 64 | 64 | 62 |
| DIN abrasion, 10 N | mm$^3$ | 93 | 94 | 80 | 91 | 66 | 85 |
| Ball rebound, 23° C. | % | 39.6 | 38.3 | 37.5 | 36.6 | 36.8 | 37.7 |
| E*, 60° C. | MPa | 7.4 | 8.2 | 9.6 | 9.1 | 8.6 | 8.2 |

TABLE 5-continued

| Physical tests | |
|---|---|
| Physical test | Standard/conditions |
| Tensile test on S 1 specimen, 23° C. (Median value from 3 specimens) | DIN 53504, ISO 37 |

Compared to the references, the examples offer a superior profile of vulcanizate values, which is reflected particularly in the overall performance. For instance, very good reinforcement is found at hardnesses comparable to the references. The superiority of the inventive silicas over the prior art is shown, however, inter alia, in an improved abrasion level, DIN abrasion, and in an improved dynamic performance. This is indicated by a lower ball rebound at 23° C., which indicates an improved wet grip performance of a tyre tread filled with the inventive silicas. The high dynamic complex modulus E* at 60° C. also leads to a higher ride stability. It can thus been shown that the silicas according to Examples 1 and 4 offer an overall performance which has to date been unattainable according to the prior art. The silica according to Example 4, in addition to the advantages described, additionally features the best processability compared to all other tested silicas, quantifiable by the lowest torque minimum in the MDR test ($M_L$). In addition, this silica offers the highest vulcanization rate of all inventive silicas in the MDR test (t 80%-t 20%).

The invention claimed is:

1. A precipitated silica having the following physicochemical properties:

| | |
|---|---|
| CTAB surface area | ≥150 m$^2$/g |
| BET surface area: | ≥150 m$^2$/g |
| DBP number | 180-350 g/(100 g) |
| half width/peak | ≤0.95 |
| d 25%/d 75% | 1.00 to 1.80 |
| relative width γ (pressed) | ≤2.8 (gnm)/ml |
| fineness value F.V. (pressed): | 100 to 140 Å. |

2. The precipitated silica according to claim 1, having a morphology index IM of 0.20 to 0.85.

3. The precipitated silica according to claim 1, having a pore volume ratio V2/V1 of 0.2 to 0.75.

4. The precipitated silica according to claim 1, having an Al$_2$O$_3$ content of 0.1 to 5.0% by weight.

5. The precipitated silica according to claim 1, having a fineness value in the pressed state F.V. (pressed) of 100 to 130 Å.

6. The precipitated silica according to claim 1, having a relative width γ of the pore size distribution of 1.5 to 2.5 (gnm)/ml.

7. The precipitated silica according to claim 1, having a half-height width of the peak normalized to the position of the peak, half width/peak, of 0.65 to 0.9.

8. The precipitated silica according to claim 1, having a d 25%/d 75% ratio of 1.20 to 1.80.

9. The precipitated silica according to claim 1, having a d 25%/d 75% ratio of 1.4 to 1.75.

10. The precipitated silica according to claim 1, having a BET surface area of 160 to 210 m$^2$/g and/or a CTAB surface area of 160 to 190 m$^2$/g and/or a morphology index IM of 0.50 to 0.80 and/or a pore volume ratio V2/V1 of 0.3 to 0.6 and/or an Al$_2$O$_3$ content of 0.1 to 2% by weight and/or a modified Sears number, Vol 2, of 23 to 27 ml/(5 g).

11. The precipitated silica according to claim 1, wherein said precipitation silica is a granule with a particle size distribution configured such that, according to a sieve residue determination (Ro-Tap), at least 80% by weight of the particles are larger than 300 μm and not more than 10% by weight are smaller than 75 μm, or it is a powder with a mean particle size d50, determined by means of laser diffraction, of 15 to 80 μm, or it is spherical particles with a particle size d50 determined by means of sieve residue determination (Alpine) of 80 μm to 1000 μm.

12. A process for preparing the precipitated silica of claim 1, comprising a) initially charging an aqueous solution of an alkali metal or alkaline earth metal silicate and/or an organic and/or inorganic base b) simultaneously metering at least one alkali metal and/or alkaline earth metal silicate and at least one acidifier into this initial charge with stirring at 75 to 88° C. for 60 to 120 minutes, d) reacidifying with at least one acidifier to a pH of from 5 to 8 e) reacidifying with at least one acidifier to a pH of from 4 to 5, at a slower metering rate than said previous reacidifying f) filtering the precipitate suspension g) washing the filtercake h) optionally liquefying the filtercake i) drying j) optionally grinding and/or granulating.

13. The process according to claim 12, further comprising, between said metering and said first reacidifying, c) continuing the addition of the acidifier in said metering and/or of another acidifier, with the same or a different metering rate from that in said metering, until a pH of the precipitate suspension of 7 to 10 has been attained and continuing to stir the resulting suspension at this pH for 40 to 80 minutes, at high temperatures of 80 to 98° C.

14. The process according to claim 12, further comprising between said washing and drying h) liquefying the filtercake.

15. The process according to claim 14, wherein during the liquefaction, aluminium is added.

16. The process according to claim 12, further comprising grinding and/or granulating after said drying.

17. The process according to claim 16, wherein the granulation is carried out with a roll compactor.

18. The process according to claim 12, wherein the base is an alkali metal and/or alkaline earth metal silicate and/or an alkali metal and/or an alkaline earth metal hydroxide.

19. The process according to claim 12, wherein an organic or inorganic salt is added anytime during the process.

20. The process according to claim 12, wherein the drying is conducted with a spin flash drier or nozzle tower.

21. The precipitated silica according to claim 1, having a surface which has been modified with an organosilane of the formulae I to III:

[SiR$^1_n$(RO)$_r$(Alk)$_m$(Ar)$_p$]$_q$[B]  (I),

SiR$^1_n$(RO)$_{3-n}$(alkyl)  (II), or

SiR$^1_n$(RO)$_{3-n}$(alkenyl)  (III), in which

B: —SCN, —SH, —Cl, —NH$_2$, —OC(O)CHCH$_2$, —OC(O)C(CH$_3$)CH$_2$ (when q=1) or —S$_w$— (when q=2), where B is chemically bonded to Alk, R and R$^1$: aliphatic, olefinic, aromatic or arylaromatic radical having 2-30 carbon atoms, which may optionally be substituted by the following groups: hydroxyl, amino, alkoxide, cyanide, thiocyanide, halogen, sulphonic acid, sulphonic ester, thiol, benzoic acid, benzoic ester, carboxylic acid, carboxylic ester, acrylate, methacrylate, organosilane radical, where R and R$^1$ may have an identical or different definition or substitution, n: 0, 1 or 2, Alk: a divalent unbranched or branched hydrocarbon radical having 1 to 6 carbon atoms, m: 0 or 1, Ar: an aryl radical having 6 to 12 carbon atoms, which may be substituted by the following groups: hydroxyl, amino, alkoxide, cyanide, thiocyanide, halogen, sulphonic acid, sulphonic ester, thiol, benzoic acid, benzoic ester, carboxylic acid, carboxylic ester, acrylate, methacrylate, organosilane radical, p: 0 or 1, with the proviso that p and n are not both 0, q: 1 or 2, w: a number from 2 to 8, r: 1, 2 or 3, with the proviso that r+n+m+p=4, alkyl: a monovalent unbranched or branched saturated hydrocarbon radical having 1 to 20 carbon atoms, alkenyl: a monovalent unbranched or branched unsaturated hydrocarbon radical having 2 to 20 carbon atoms.

22. The precipitated silica according to claim 1, having a surface which has been modified with organosilicon compounds of the composition $SiR^2_{4-n}X_n$ (where n=1, 2, 3, 4), $[SiR^2_xX_yO]_z$ (where $0 \leq x \leq 2$; $0 \leq y \leq 2$; $3 \leq z \leq 10$, where x+y=2), $[SiR^2_xX_yN]_z$ (where $0 \leq x \leq 2$; $0 \leq y \leq 2$; $3 \leq z \leq 10$, where x+y=2), $SiR^2_nX_mOSiR^2_oX_p$ (where $0 \leq n \leq 3$; $0 \leq m \leq 3$; $0 \leq o \leq 3$; $0 \leq p \leq 3$, where n+m=3, o+p=3), $SiR^2_nX_mNSiR^2_oX_p$ (where $0 \leq n \leq 3$; $0 \leq m \leq 3$; $0 \leq o \leq 3$; $0 \leq p \leq 3$, where n+m=3, o+p=3), and/or $SiR^2_nX_m[SiR^2_xX_yO]_zSiR^2_oX_p$ (where $0 \leq n \leq 3$; $0 \leq m \leq 3$; $0 \leq x \leq 2$; $0 \leq y \leq 2$; $0 \leq o \leq 3$; $0 \leq p \leq 3$; $1 \leq z \leq 10\,000$, where n+m=3, x+y=2, o+p=3), where $R^2$: substituted and/or unsubstituted alkyl and/or aryl radicals having 1-20 carbon atoms and/or alkoxy and/or alkenyl and/or alkynyl groups and/or groups comprising sulphur X: silanol, amino, thiol, halogen, alkoxy, alkenyl and/or hydrogen radical.

23. A process for preparing the silicas according to claim 21, wherein the precipitated silicas are modified with organosilicon compounds in mixtures of 0.5 to 50 parts, based on 100 parts of precipitated silica, wherein the reaction between precipitated silica and organosilicon compounds is carried out during the preparation of the mixture (in situ) or outside by spraying and then heating the mixture, by mixing the organosilicon compound and the silica suspension with subsequent drying and heat treatment.

* * * * *